United States Patent
Nishiyama et al.

(10) Patent No.: US 8,519,592 B2
(45) Date of Patent: Aug. 27, 2013

(54) SYNCHRONOUS ELECTRIC MOTOR

(75) Inventors: Noriyoshi Nishiyama, Osaka (JP); Masaki Tagome, Osaka (JP); Yasuhiro Kondo, Osaka (JP); Makoto Kitabatake, Nara (JP); Shun Kazama, Osaka (JP)

(73) Assignee: Panasonic Corporation, Osaka (JP)

(*) Notice: Subject to any disclaimer, the term of this patent is extended or adjusted under 35 U.S.C. 154(b) by 198 days.

(21) Appl. No.: 13/054,074

(22) PCT Filed: Jul. 27, 2009

(86) PCT No.: PCT/JP2009/003519
§ 371 (c)(1),
(2), (4) Date: Aug. 29, 2011

(87) PCT Pub. No.: WO2010/013433
PCT Pub. Date: Feb. 4, 2010

(65) Prior Publication Data
US 2011/0304236 A1  Dec. 15, 2011

(30) Foreign Application Priority Data
Jul. 30, 2008 (JP) ................. 2008-195952

(51) Int. Cl.
*H02K 3/04* (2006.01)
*H02K 1/00* (2006.01)

(52) U.S. Cl.
USPC ............ 310/198; 310/184; 310/180; 310/208

(58) Field of Classification Search
USPC .................. 310/198, 195, 184, 179, 180, 208
See application file for complete search history.

(56) References Cited

U.S. PATENT DOCUMENTS

| | | | | |
|---|---|---|---|---|
| 5,804,904 A * | 9/1998 | Park et al. | ............. | 310/216.074 |
| 6,034,460 A | 3/2000 | Tajima et al. | | |
| 7,417,349 B2 * | 8/2008 | Tajima et al. | ............ | 310/156.53 |
| 2005/0046304 A1 | 3/2005 | Tamaki et al. | | |
| 2007/0194650 A1 * | 8/2007 | Ito et al. | ......... | 310/179 |

FOREIGN PATENT DOCUMENTS

| | | |
|---|---|---|
| JP | 3-103049 | 4/1991 |
| JP | 9285088 | 10/1997 |
| JP | 10-225035 | 8/1998 |
| JP | 2000-41392 | 2/2000 |
| JP | 2003-244915 | 8/2003 |
| JP | 2005-73450 | 3/2005 |

* cited by examiner

*Primary Examiner* — Tran Nguyen
*Assistant Examiner* — Leda Pham

(57) ABSTRACT

A synchronous electric motor includes rotor having a plurality of radially-oriented magnetic dipoles and a stator. Stator teeth group with a plurality of sets of stator teeth are arranged in the same position in terms of an electrical angle with another stator teeth group to provide rotational symmetry about an axis of the rotor. In each of the stator teeth groups a predetermined number of stator teeth are arranged at intervals different from intervals of the rotor magnetic dipoles. A main coil is wound about a predetermined number of stator teeth with a sub-coil further wound around one or more a teeth. Phase and magnitude of a resulting magnetic field is adjusted by the number of loops of the main coil and sub-coil. A given stator tooth can produce maximum torque despite any difference between an alignment of the stator tooth and an interpolar interval of the stator.

17 Claims, 14 Drawing Sheets

D=π/9 radians

E = π/12 radians

E = π/12 radians

F=π/18 radians

SYNCHRONOUS ELECTRIC MOTOR

TECHNICAL FIELD

The present invention relates to the coil structure of a synchronous electric motor, and in particular to enhancement of the torque performance thereof.

BACKGROUND ART

Given demand for synchronous electric motors, used in compressors, electric vehicles, hybrid vehicles, fuel-cell vehicles and the like, that are light and compact as well as high-output, low-vibration, low-noise, high-efficiency motors, a motor producing high torque with low torque rippling is particularly desired.

In a surface permanent magnet synchronous motor, where permanent magnets arranged on the surface of a rotor core, the torque produced by the permanent magnets (magnetic torque) is maximal when the magnetic fields produced by the permanent magnets have a 90° phase difference with the armature current, or in other words, when the current provided to the stator coils is maximum when the positional relationship between the inter-polar gaps on the rotor and the stator teeth around which the stator coils are wound is such that the two face one another. Any deviation from the 90° phase difference between the permanent magnet-produced magnetic fields and the armature current results in reduced torque.

Also, in an interior permanent magnet synchronous electric motor, where the permanent magnets are arranged inside the core, in addition to magnetic torque from the permanent magnets, reluctance torque is also produced due to the salient polarity owing to the difference in magnetic reluctance caused by the positions of the rotor and stator. Reluctance torque is maximal when the phase difference between the permanent magnet-produced magnetic fields and the armature current is in the neighborhood of 45°. Accordingly, the torque from an interior permanent magnet synchronous electric motor is a combination of magnetic torque and reluctance torque, and that torque is maximal when the phase difference between the magnetic fields and armature current is between 0° and the neighborhood of 45°.

Ordinarily, the torque of a synchronous electric motor features a ripple component that is based on the influence of the harmonic component of the permanent magnet-produced magnetic fields, the influence of the harmonic component of the armature current, and the like. As such, there exists technology for reducing torque rippling by mechanically offsetting the placement interval (angle) of the stator coils through which flows current in a single phase from the inter-polar interval (angle) of the rotor. Through the use of such technology, the phases of the torque pulsation produced by the stator coils are offset from each other and the torque rippling can be negated. As a result, a low-vibration, low-noise motor can be realized (examples cited in Patent Literature 1 and 2).

Patent Literature 1 discloses a synchronous electric motor in which the stator coils are concentrated coils, i.e. coils that are wound concentrically around a single stator tooth, the number of magnetic dipoles in the rotor is 10, and the stator teeth are arranged in two groups repeating a +U-phase, a −U-phase, a +V-phase, a −V-phase, a +W-phase, and a −W-phase, in that order, for a total of 12 teeth. In that example, stator teeth through which flows current of one phase (such as the +U-phase and −U-phase) are offset by an electrical angle of π/6 radians, so that the torque ripple produced by the respective stator coils is offset by π/6 radians. As a result, the torque ripple can be reduced.

Furthermore, Patent Literature 2 discloses the number of slots (equivalent to teeth) in which stator coils are arranged and where the number of magnetic dipoles on the rotor is such that a relation of 18 slots to 20 dipoles is satisfied. In comparison to a conventional synchronous electric motor, which has 12 slots to 8 dipoles or 9 slots to 8 dipoles, the cogging torque, or torque ripple that occurs when no current is flowing, can be reduced through such technology.

[Citation List]
[Patent Literature]
[Patent Literature 1]
 Japanese Patent Application Publication No. H9-285088
[Patent Literature 2]
 Japanese Patent Application Publication No. 2003-244915
[Patent Literature 3]
 Japanese Patent Application Publication No. 2000-041392

SUMMARY OF INVENTION

Technical Problem

As described above, if stator coils are wound around each of several stator teeth arranged at intervals that differ from the inter-polar intervals of the rotor, and if current in a single phase is supplied to such stator coils, the phase of the torque ripple produced by each of the stator teeth can be offset, and as a result, the total torque ripple can be reduced.

However, in the above-described structure, when a given stator tooth is in position with respect to a magnetic dipole on the rotor to produce maximal torque, the stator teeth arranged at intervals that differ from the rotor inter-polar interval of that stator tooth are offset from the position in which those teeth produce maximal torque, and thus torque production cannot be maximized. That is, with conventional technology, the effect of torque ripple reduction is a problematic reduction in total torque.

The present invention has been achieved in view of the above problems, and an aim thereof is to provide a technology that can reduce torque rippling while inhibiting torque reduction.

Solution to Problem

In order to solve the above problems, the present invention provides a synchronous electric motor, comprising: a rotor having a plurality of radially-oriented magnetic dipoles distributed circumferentially along a rotation direction of the rotor at equal intervals and a stator having a plurality of stator teeth arranged circumferentially along the rotation direction of the rotor, wherein the plurality of stator teeth form stator teeth groups, each of the stator teeth groups including a predetermined number of consecutive stator teeth and the stator teeth groups being arranged at equal intervals, for each of the stator teeth groups, the predetermined number of stator teeth included therein are arranged at intervals different from the intervals of the magnetic dipoles of the rotor, a main coil is wound around each of the predetermined number of stator teeth and a sub-coil is further wound around each of one or more stator teeth among the predetermined number of stator teeth, coils in a first phase are constituted by, in series, (i) the predetermined number of the main coils included in a given one of the stator teeth groups and (ii) one or more of the sub-coils included in one or more of the other stator teeth groups that are in a different position from the given one of the stator teeth groups in terms of electrical angle, and coils in a second phase are constituted by, in series, (i) one or more of the sub-coils included in the given one of the stator teeth groups and (ii) the predetermined number of the main coils included in one of more of the other stator teeth groups that are in a different position from the given one of the stator teeth groups in terms of electrical angle.

Advantageous Effects of Invention

According to the present invention, the following effects can be achieved.

In the above structure, for each of the stator teeth groups, the predetermined number of stator teeth included therein are arranged at intervals different from the intervals of the magnetic dipoles of the rotor. Thus, the cogging torque, i.e. torque rippling that occurs when no current is flowing, can be reduced.

In addition, according to the above structure, the main coil and the sub-coil wound around a single stator tooth are each part of a coil in a different phase. Thus, the magnetic field produced by the stator tooth is as given by vector combination of the magnetic field due to the main coil and the magnetic field due to the sub-coil. The phase and magnitude of a magnetic field so obtained can be adjusted at will through adjustment of the number of loops of the main coil and sub-coil. Accordingly, through appropriate adjustment of the number of loops of the main coil and the sub-coil for each stator tooth, a given stator tooth can produce maximal torque despite the difference between the alignment of the stator teeth and that of the inter-polar intervals of the stator. As a result, the total torque can be enhanced.

It should be noted that, in the above structure, all of the main coils and sub-coils wound around the stator teeth are concentrated coils, and as such, in comparison to the synchronous electric motor disclosed in Patent Literature 3 which uses distributed coils, the present invention has shorter coil end portions and can have coils of a shorter wire length. Accordingly, a miniaturized, high-efficiency synchronous electric motor can be achieved.

DESCRIPTION OF EMBODIMENTS

Preferred embodiments of the present invention are described below with reference to the drawings.

[Embodiment 1]
(General Configuration)

Figure 1:
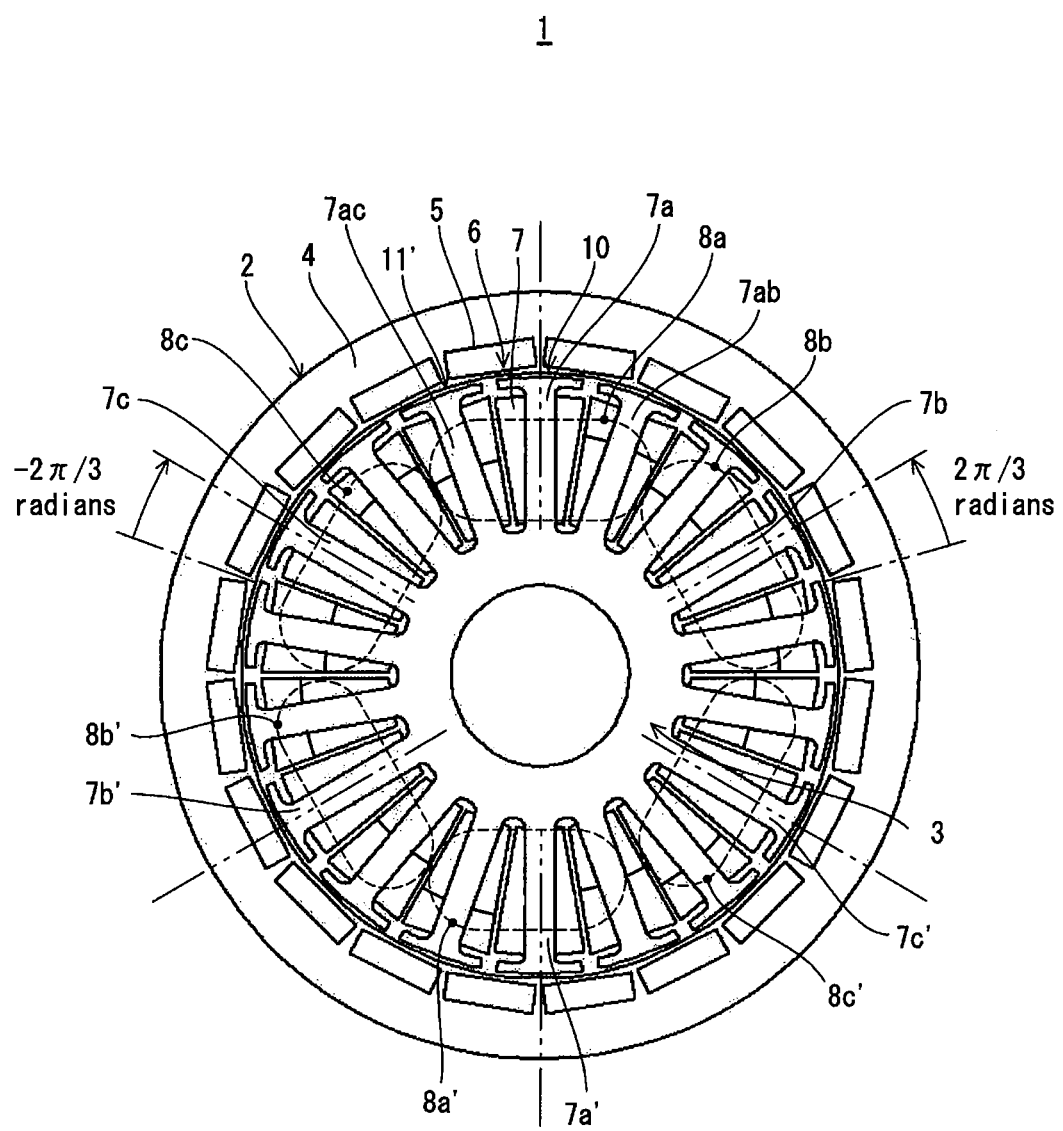
FIG. 1 shows a plan view of the synchronous electric motor pertaining to Embodiment 1 of the present invention.
Figure 2:
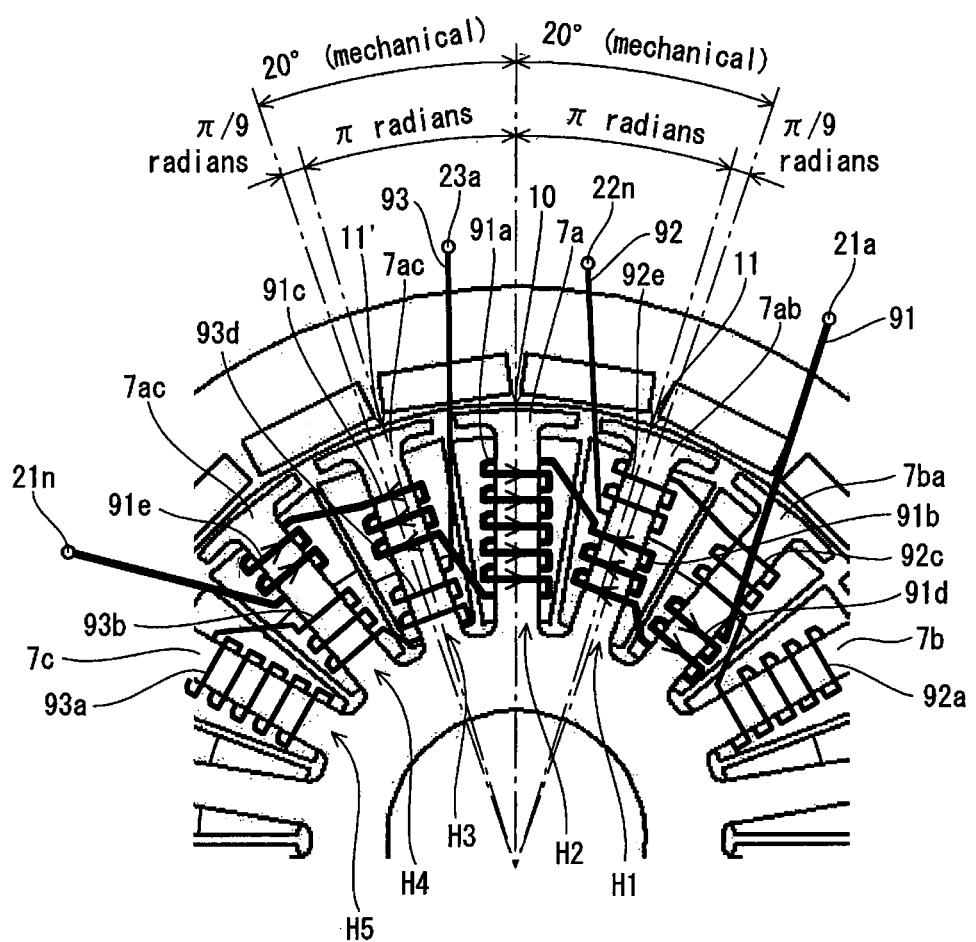
FIG. 2 shows a detailed diagram of the synchronous electric motor of FIG. 1.

FIG. 1 is a plan view of the synchronous electric motor pertaining to Embodiment 1 of the present invention. FIG. 2 is a detailed diagram of the synchronous electric motor of FIG. 1.

The synchronous electric motor 1 comprises a rotor 2 and a stator 3.

The rotor 2 includes a rotor core 4 and 20 permanent magnets 5. The permanent magnets 5 are arranged along the rotor core 4 in the circumferential direction of the rotor at equally-spaced intervals. The permanent magnets 5 comprise magnetic dipoles 6 which are arranged so that alternating north and south magnetic poles face the stator 3. A pair of north and south magnetic poles forms an electrical angle of $2\pi$ radians, and the interval between neighboring magnetic dipoles is the electrical angle of $\pi$ radians. In the present Embodiment, the rotor has 20 magnetic dipoles, and the relationship of the electrical angle to the mechanical angle is ten-fold.

The stator 3 includes 18 stator teeth 7 which are arranged to face the rotor 2. Given 20 magnetic dipoles and 18 stator teeth, the stator teeth 7 are arranged circumferentially and offset by a factor of 10/9 per semicircle. It should be noted that although FIG. 1 shows stator teeth marked with alphanumeric reference symbols such as "7a", the term "stator teeth 7" is here used as a general term for all 18 stator teeth whenever there is no need to distinguish individual stator teeth. The same applies to the reference symbols of other structural elements. Coils 9 are wound around each of the stator teeth 7.

The rotor inter-polar gaps 10 and 11 represent the positions of magnetic neutral points between north magnetic poles and south magnetic poles of the permanent magnets arranged on the rotor. Such positions are also mechanically located in the gaps between any two magnets. Inter-polar gaps where a north pole is followed by a south pole when progressing counterclockwise are shown as 10, and inter-polar gaps where a south pole is followed by a north pole when progressing counterclockwise are shown as 11. It should be noted that 11' is at an electrical angle of $2\pi$ radians from the inter-polar gap 11 and, due to repetition of a pair of magnetic dipoles, indicates the same position in terms of electrical angle but a different position in terms of mechanical angle (Stator Teeth Group Structure)

Next, the structure of the stator teeth groups is explained. The 18 stator teeth 7 form stator teeth groups 8 with three individual stator teeth lined up circumferentially forming one group. A total of six stator teeth groups so structured, namely stator teeth groups 8a, 8b, 8c, 8a', 8b', and 8c', are arranged at equally-spaced intervals every mechanical angle of 60°.

The stator teeth groups comprise a plurality of stator teeth lined up in the circumferential direction of the rotor. With respect to the phase relationship with the rotor demonstrated by reference stator teeth, a stator teeth group comprises stator teeth that demonstrate a closer phase relationship with the rotor than that demonstrated by other reference stator teeth. Here, each of the stator teeth groups 8 comprises three stator teeth. Each of the stator teeth groups 8 comprises one stator tooth around which only a main coil is wound as well as two stator teeth around which both a main coil and a sub-coil are wound. It should be noted that when only one coil is wound around a stator tooth, that coil is called a main coil, and that when two coils are wound around a stator tooth, the coil with more loops is called a main coil while the coil with fewer loops is called the sub-coil.

As shown in FIG. 2, the stator teeth group 8a comprises the reference stator tooth 7a, which demonstrates a phase relationship with the rotor, as well as neighboring stator teeth 7ab and 7ac. Taking the counterclockwise direction as positive, the stator tooth 7ab is situated at a position $\pi/9$ radians behind the position offset by an electrical angle of $\pi$ radians from the stator tooth 7a, and the stator tooth 7ac is situated at a position $\pi/9$ radians ahead of the position offset by an electrical angle of $\pi$ radians from the stator tooth 7a.

In addition, only the main coil 91a is wound around the stator tooth 7a. The main coil 91b and the sub-coil 92e are both wound around the stator tooth 7ab, and the main coil 91c and the sub-coil 93d are both wound around the stator tooth 7ac. The stator tooth 7ab is flanked by the reference stator teeth 7a and 7b, which demonstrate a phase relationship with the rotor. However, because the phase of the stator tooth 7a is comparatively closer to that of the stator tooth 7ab than is the phase of the stator tooth 7b to which $\pi$ radians have been added, the stator tooth 7ab belongs to the same stator teeth group as the stator tooth 7a, which is the stator teeth group 8a. Also, the stator tooth 7ac is flanked by the reference stator teeth 7a and 7c, which demonstrate a phase relationship with the rotor. However, because the phase of the stator tooth 7a is comparatively closer that of the stator tooth 7ac than is the phase of the stator tooth 7c to which $\pi$ radians have been added, the stator tooth 7ac belongs to the same stator teeth group as the stator tooth 7a, which is the stator teeth group 8a. The same applies to the stator teeth groups 8b, 8c, 8a', 8b', and 8c'.

It should be noted that in the synchronous electric motor 1, the arrangement of the combination of stator teeth groups 8a, 8b, and 8c is repeated in the circumferential direction by a second combination (stator teeth groups 8a', 8b' and 8c'), and the arrangement of the combination of stator teeth 7a, 7b, and 7c is repeated in the circumferential direction by a second combination (stator teeth 7a', 7b' and 7c').

(Stator Coil Structure)

The structure of the stator coils is explained next. In the present Embodiment, a stator coil of a single phase comprises the three main coils included in a stator teeth group, one sub-coil included in the clockwise-neighboring stator teeth group of that stator teeth group, and one sub-coil included in the counterclockwise-neighboring stator teeth group of that stator teeth group.

For example, as shown in FIG. 2, the stator coil 91 comprises the main coils 91a, 91b, and 91c included in the stator teeth group 8a, the sub-coil 91d included in the stator teeth group 8b, and the sub-coil 91e included in the stator teeth group 8c, all serially connected. The end portion 21a of the stator coil 91 is connected to a U-phase input terminal, and the end portion 21n of the stator coil 91 is connected to a neutral point. It should be noted that while the expression "serially connected" is used for convenience, the structure is not limited to one in which wire is wound around each of the stator teeth individually and connected afterward; a structure in which a single wire is continuously wound around each of the stator teeth is also implied.

The stator coil 92 comprises the main coils 92a, 92b, and 92c included in the stator teeth group 8b, the sub-coil 92d included in the stator teeth group 8c', and the sub-coil 92e included in the stator teeth group 8a, all serially connected. The end portion 22a of the stator coil 92 is connected to a V-phase input terminal, and the end portion 22n of the stator coil 92 is connected to a neutral point.

Similarly, the stator coil 93 comprises the main coils 93a, 93b, and 93c included in the stator teeth group 8c, the sub-coil 93e included in the stator teeth group 8b', and the sub-coil 93d included in the stator teeth group 8a, all serially connected. The end portion 23a of the stator coil 93 is connected to a W-phase input terminal, and the end portion 23n of the stator coil 93 is connected to a neutral point. In the synchronous electric motor 1, the arrangement of the combination of stator coils 91, 92, and 93 is repeated in the circumferential direction by a second combination (stator teeth coils 91', 92', and 93').

In the present Embodiment, in order to attain the above-described structure for the stator coils in each phase, current in different phases is supplied to the respective main coil and sub-coil wound around each stator tooth. Therefore, a magnetic field produced by a stator tooth is a vector combination of the magnetic field due to the main coil and the magnetic field due to the sub-coil. For example, the stator tooth 1ab produces a magnetic field that is a vector combination of the magnetic fields due to the U-phase current flowing in the main coil 91b and the V-phase current flowing in the sub-coil 92e. Similarly, the stator tooth 7ac produces a magnetic field that is a vector combination of the magnetic fields due to the U-phase current flowing in the main coil 91c and the W-phase current flowing in the sub-coil 93d. Also, the reference stator tooth 7a, which displays a phase relationship with the rotor, produces a magnetic field due to the U-phase current flowing in the main coil 91a. The magnetic fields produced by each of the stator teeth 7a, 7ab, and 7ac thus differ in phase.

(Stator Teeth-Produced Magnetic Fields)

Figure 3:
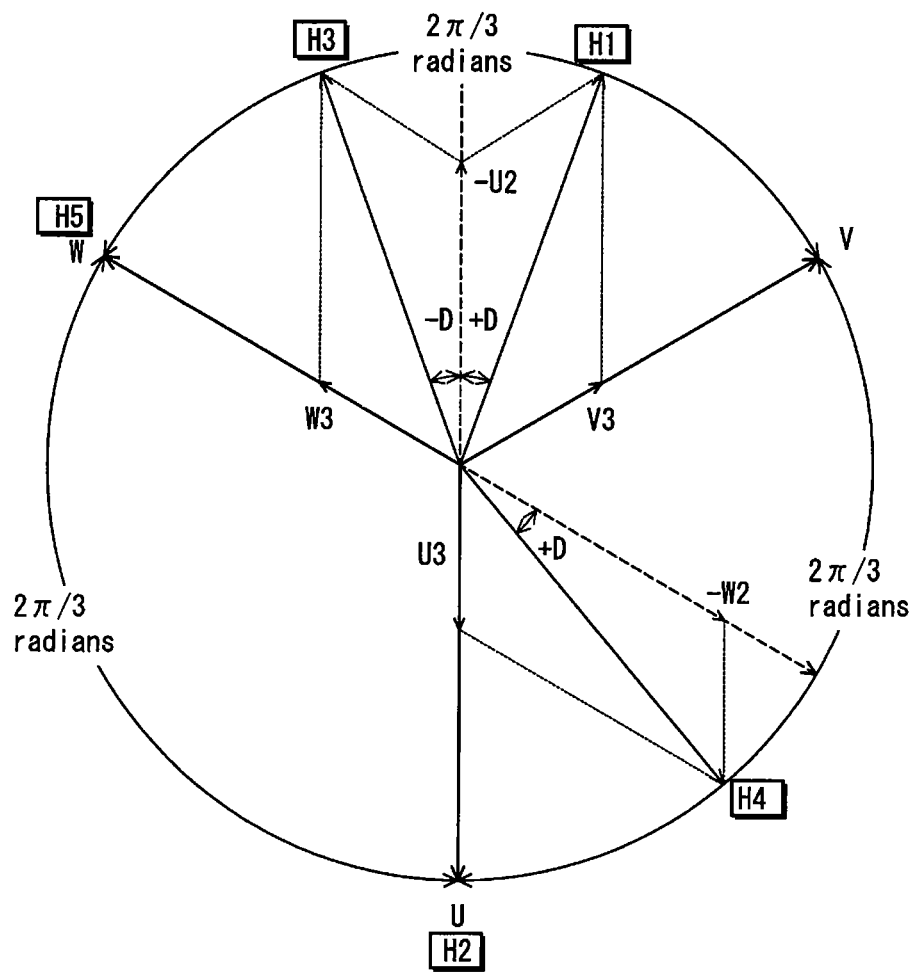
FIG. 3 shows a vector diagram of the magnitudes and phases of the magnetic fields pertaining to Embodiment 1 of the present invention.

FIG. 3 is a vector diagram that shows the magnitudes and phases of the magnetic fields pertaining to Embodiment 1 of the present invention. The magnetic fields produced by the stator teeth are explained using FIGS. 2 and 3.

The synchronous electric motor 1 is a three-phase synchronous electric motor, and the phase difference between the U-phase, V-phase, and W-phase current is an electrical angle of $2\pi/3$ radians. N1 loops of the U-phase coil 91 are wound in a first direction around the stator tooth 7a (FIG. 2, H2). When the U-phase current reaches a maximum, the vector of magnetic field produced by the current flowing in the U-phase coil 91 of the stator tooth 7a is shown as H2 in FIG. 3.

N112 loops of the U-phase coil 91 are wound in a second direction, which is the opposite of the first direction, around the stator tooth 7ab (FIGS. 2, H1), and N212 loops of the V-phase coil 92 are also wound therearound. When the U-phase current reaches a maximum, the vector of the magnetic field produced by the current flowing in the U-phase coil 91 of the stator tooth 7ab is shown as −U2 in FIG. 3, and the vector of the magnetic field generated by the current flowing in the V-phase coil 92 of the stator tooth 7ab is shown by V3 in FIG. 3. The vector of the magnetic field obtained by combining the two is shown as H1 in FIG. 3.

N113 loops of the U-phase coil 91 are wound in the second direction around the stator tooth 7ac (FIGS. 2, H3), and N313 loops of the W-phase coil 93 are wound therearound. When the U-phase current reaches a maximum, the vector of the magnetic field produced by the current flowing in the U-phase coil 91 of the stator tooth 7$ac$ is shown as −U2 in FIG. 3, and the vector of the magnetic field generated by the current flowing in the W-phase coil 93 of the stator tooth 7$ac$ is shown as W3 in FIG. 3. The vector of the magnetic field obtained by combining the two is shown as H3 in FIG. 3.

Here,

A=number of magnetic dipoles (A is an even number, A≧2)=20,

B=number of stator teeth (B is a multiple of 3, B≠A)=18,

P=number of magnetic dipole pairs (P=A/2)=10, and k=number of stator teeth per phase (k=B/3)=6.

Given that the motor is driven with three-phase current that has a phase difference of 2π/3 radians in terms of electrical angle, the coil coefficient α can be calculated according to the equation below.

$$\alpha = |2\pi/A - 2\pi/B| \cdot P$$
$$= |2\pi/20 - 2\pi/18| \cdot 10$$
$$= \pi/9 \text{ radians}$$

If the number of loops of the U-phase coil 91 wound around the stator tooth 7$a$ is N1, then the number of loops wound around the stator tooth 7$ab$, N112 for the U-phase coil 91 and N212 for the V-phase coil 92, is given as follows.

$$N112 \approx (N1) \cdot [\sin(\pi/3 - \pi/9)/\sin(\pi/3)]$$
$$\approx (N1) \cdot [\sin(2\pi/9)/\sin(\pi/3)]$$
$$N212 \approx (N1) \cdot [\sin(\pi/9)/\sin(\pi/3)]$$

If the number of loops of each coil is adjusted as such, then the magnetic field H1 produced by the stator tooth 7$ab$ has approximately the same magnitude as the magnetic field H2 produced by the stator tooth 7$a$ but is oriented in the opposite direction as the magnetic field H2 produced by the stator tooth 7$a$ (offset by π radians) and is additionally in a phase that is ahead by an electrical angle of π/9 radians.

Also, the number of loops wound around the stator tooth 7$ac$, N113 for the U-phase coil 91 and N313 for the W-phase coil 93, is given as follows.

$$N113 \approx (N1) \cdot [\sin(\pi/3 - \pi/9)/\sin(\pi/3)]$$
$$\approx (N1) \cdot [\sin(2\pi/9)/\sin(\pi/3)]$$
$$N313 \approx (N1) \cdot [\sin(\pi/9)/\sin(\pi/3)]$$

If the number of loops of each coil is adjusted as such, then the magnetic field H3 produced by the stator tooth 7$ac$ has approximately the same magnitude as the magnetic field H2 produced by the stator tooth 7$a$ but is oriented in the opposite direction as the magnetic field H2 produced by the stator tooth 7$a$ (offset by π radians) and is additionally in a phase that is behind by an electrical angle of π/9 radians.

It should be noted that the "approximately equals" symbol (≈) is used between the right and left terms in the expressions above because in many cases, true equality may be difficult to achieve. The above symbol may allow for an integer to nearly match a right-side-term decimal, and may also allow a degree of design tolerance to be ignored as such while being treated as a match.

In FIG. 2, the stator tooth 7$ab$ is located π/9 radians behind a position offset by π radians from the stator tooth 7$a$, in terms of electrical angle. Given this positional relationship for the stator tooth 7$ab$, then in terms of electrical angle, the magnetic field H1 is produced π/9 radians ahead of a position π radians from the magnetic field H2, and thus when the axis of the stator tooth 7$ab$ and the rotor inter-polar gap 11 coincide, a magnetic field at maximum magnitude is produced by the stator tooth 7$ab$. Additionally, a magnetic field at maximum magnitude can also be produced by the stator tooth 7$a$ when the axis of the stator tooth 7$a$ and the rotor inter-polar gap 10 coincide.

Also, in FIG. 2, the stator tooth 7$ac$ is located π/9 radians ahead of a position offset by π radians from the stator tooth 7$a$, in terms of electrical angle. Given this positional relationship for the stator tooth 7$ac$, then in terms of electrical angle, the magnetic field H3 is produced to π/9 radians behind a position π radians from the magnetic field H2, and thus when the axis of the stator tooth 7$a$ and the rotor inter-polar gap 10 coincide, a magnetic field at maximum magnitude is produced by the stator tooth 7$a$. Additionally, a magnetic field at maximum magnitude can also be produced by the stator tooth 7$ac$ when the axis of the stator tooth 7$ac$ and the rotor inter-polar gap 11' coincide.

As shown, in the present Embodiment, when the axes of the stator teeth and the rotor inter-polar gaps coincide, the stator teeth-produced magnetic fields are at maximum magnitude, and so the magnetic torque produced by each of the stator teeth is also maximized, which can in turn increase the total torque. Also, the torque produced by each of the stator teeth is nearly uniform, which can reduce torque rippling.

(Torque Comparison)

Figure 4:
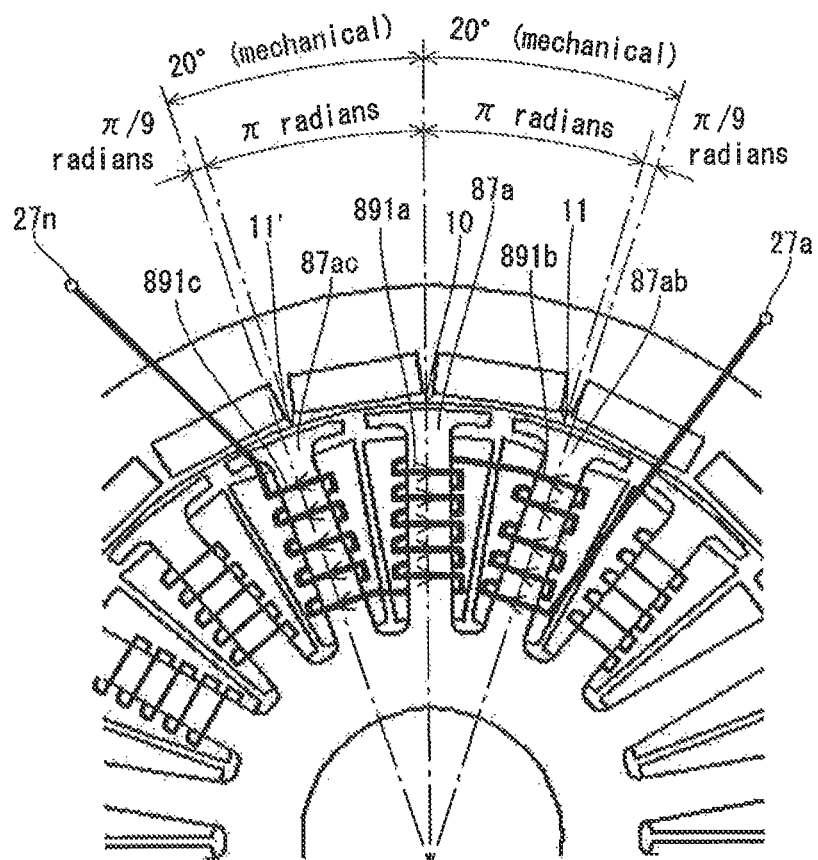
FIG. 4 shows a detailed diagram of a conventional synchronous electric motor.

Next, the torque that can be obtained from the synchronous electric motor of the present Embodiment is compared with the torque that can be obtained from a conventional synchronous electric motor. FIG. 4 is a detailed diagram of a conventional synchronous electric motor. A conventional synchronous electric motor differs from the present Embodiment in the structure of the coils. As shown in FIG. 4, the coils 891$a$, 891$b$, and 891$c$ are respectively wound around the stator teeth 87$a$, 87$ab$, and 87$ac$, and are serially connected. Around each of the stator teeth is wound only a U-phase coil, and thus the magnetic fields produced by each of the stator teeth are in the same phase. That is, supposing that a magnetic field at maximum magnitude is produced by the stator tooth 87$a$ when the axis of the stator tooth 87$a$ and the rotor inter-polar gap 10 coincide, then a magnetic field at maximum magnitude will be produced by the stator tooth 87$ab$ when the axis of the stator tooth 87$ab$ and the rotor inter-polar gap 11 are misaligned, and a magnetic field at maximum magnitude will similarly be produced by the stator tooth 87$ac$ when the axis of the stator tooth 87$ac$ and the rotor inter-polar gap 11' are misaligned. For this reason, while the magnetic torque produced by the stator tooth 87$a$ can be maximized, the magnetic torque produced by the stator teeth 87$ab$ and 87$ac$ cannot be maximized. Accordingly, in comparison with the present Embodiment, the total torque produced by the conventional synchronous electric motor is lower and torque rippling therein is more significant.

Figure 5:
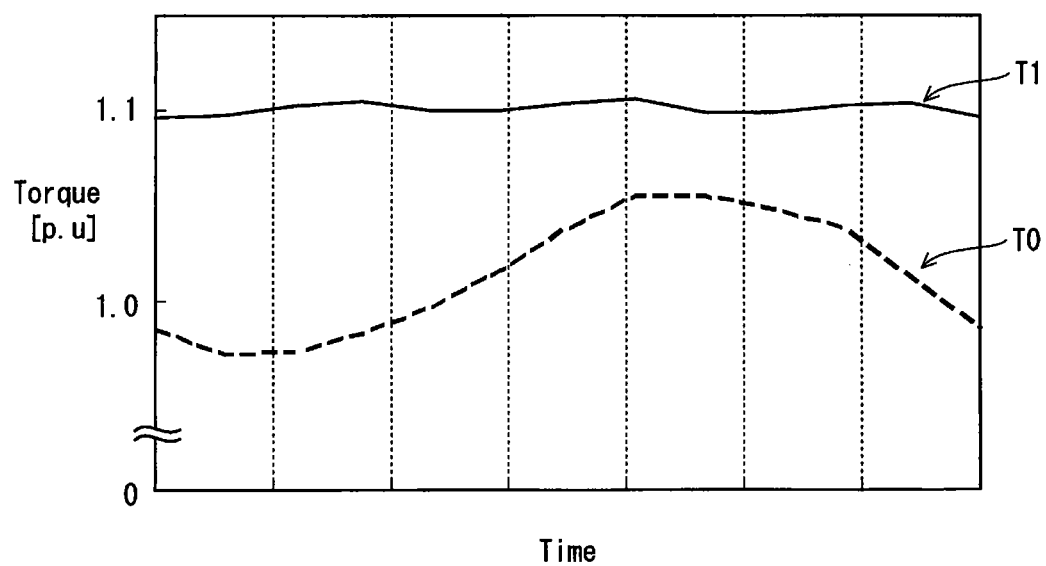
FIG. 5 shows the change in torque over time.

FIG. 5 is a diagram showing the change in torque over time.

The torque waveform that can be obtained from the synchronous electric motor of the present Embodiment is shown as T1, and the torque waveform that can be obtained from a conventional synchronous electric motor is shown as T0. The magnitude of the torque for the present Embodiment is 105% greater than that of the conventional synchronous electric motor. Also, the torque ripple relative to average torque, expressed as a torque ripple ratio, is 0.5% in the present Embodiment, presenting a great reduction from the conventional 5.3%. According to the present Embodiment as shown, enhanced torque can coexist with reduced torque rippling whereas conventionally, a tradeoff was thought to exist between the two.

(Supplemental Explanations)

In the synchronous electric motor of the present Embodiment, the rotor magnetic dipoles are spaced apart by a mechanical angle of 18° (or an electrical angle of π radians), and in contrast, the three stator teeth within a stator teeth group are spaced apart at a mechanical angle of 20°, offset from the mechanical angle of 18°. According to this mechanical phase difference, the cogging torque, or torque rippling that occurs when no current is flowing, can be reduced.

In addition, in the synchronous electric motor of the present Embodiment, the stator teeth within a stator teeth group are each arranged so as to have a phase difference of π/9 radians from the electrical angle of π radians, and thus the magnetic fields produced by each of the stator teeth are, made to have a phase difference of π/9 radians. For this reason, the torque obtained from each of the stator teeth can be made equal, hence why torque rippling, with a fundamental period of π/3 radians, can be removed. Also, considering that the torque obtained from each of the stator teeth can thus be maximized, the total torque can therefore be increased.

It should be noted that the above explanation is given with only the magnetic torque from the permanent magnets taken into consideration. Therefore, the phase of the magnetic fields produced by each of the stator teeth is adjusted so that the magnetic fields will be at maximum magnitude when the axes of the stator teeth and the rotor inter-polar gaps coincide. However, the synchronous electric motor of the present Embodiment is an interior permanent magnet synchronous motor in which the permanent magnets are arranged inside the rotor core. As such, in addition to the magnetic torque from the magnets, reluctance torque from the difference in magnetic reluctance can also be used in the synchronous electric motor. For this reason, there are possible cases in which adjusting the phase of the magnetic fields produced by the stator teeth so that the maximum magnitude will be achieved when the axes of the stator teeth and the rotor inter-polar gaps are misaligned may be effective in order to obtain maximum torque using both magnetic torque and reluctance torque.

Additionally, in the present Embodiment, concentrated coils are used for the stator coils that are wound around the stator teeth. Therefore, the synchronous electric motor can be miniaturized by working out the miniaturization of the coils at the end of the stator teeth, i.e. the coil ends. Also, as the coil ends are parts that contribute nothing to torque regardless of current flow, reducing copper loss, i.e. joules lost due to coil resistance when current is flowing, is highly effective when this is accomplished.

Furthermore, in the present Embodiment, an outer rotor is used, i.e. the rotor is arranged at the outer perimeter of the stator. As such, the rotor diameter can be increased in comparison to other motors of the same volume, such as in comparison to an inner rotor where the rotor is arranged at the inner perimeter of the stator. Accordingly, effective magnetic flux reduction can be prevented with no need to reduce the size of the permanent magnets, even in a synchronous electric motor that has 20 dipoles such as that of the present Embodiment.

Additionally, for the synchronous electric motor of the present Embodiment, the number of rotor magnetic dipoles is 20 and the number of stator teeth is 18. However, the number of stator teeth may be 9, 27, or any other multiple of 9, and the number of rotor magnetic dipoles may be any multiple of 10, such that the combination is 10q dipoles to 9q teeth (where q is a positive integer). This allows for the above-described positional relationships in terms of electrical angle, and thus the same effects can be obtained.

Further, in the present Embodiment, there are two sets of stator teeth groups, one with the stator teeth groups 8a, 8b, and 8c, and one with the stator teeth groups 8a', 8b', and 8c'. These groups are arranged so as to have axial symmetry. Thus, the combined attractive force in the radial direction due to the stator teeth is zero and magnetic attractive force does not influence the rotor. Accordingly, negative influences affecting the bearing life are removed and a longer-lasting synchronous electric motor can be obtained. Similarly, for 30 dipoles and 27 teeth, given that the three axes of the stator teeth groups that are connected to neutral points are arranged apart by a mechanical angle of 120°, the combined attractive force in the radial direction by the stator teeth with coils through which current is flowing is zero, and magnetic attractive force does not influence the rotor.

Additionally, through a structure in which one or both of the stator teeth and the rotor magnetic dipole are made to revolve in the direction of the rotation axis, magnetic flux variations are smoothed out and a low-vibration synchronous electric motor can be achieved.

Furthermore, by using iron powder magnetic cores, laminated magnetic material, or amorphous magnetic material for the magnetic material in the stator, iron loss can be greatly reduced and a better high-efficiency synchronous electric motor can be achieved.

In addition, by using a structure with multiple permanent magnets each comprising one dipole, the eddy current losses that occur due to the permanent magnets can be reduced and a better high-efficiency synchronous electric motor can be achieved.

Also, the surface area of the coils can be increased by using multiple small-diameter coils or by using flat, rectangular wire, which reduces the skin effects during high-frequency driving and makes possible a high-efficiency synchronous electric motor.

According to the present Embodiment described above, a miniaturized, high-output, low-vibration, low noise, high-efficiency synchronous electric motor can be provided that has increased torque and reduced torque rippling.

[Embodiment 2]

Embodiment 2 differs from Embodiment 1 in the structure of the stator coils. Other structural aspects are identical to those explained for Embodiment 1 and are omitted below.

Figure 6:
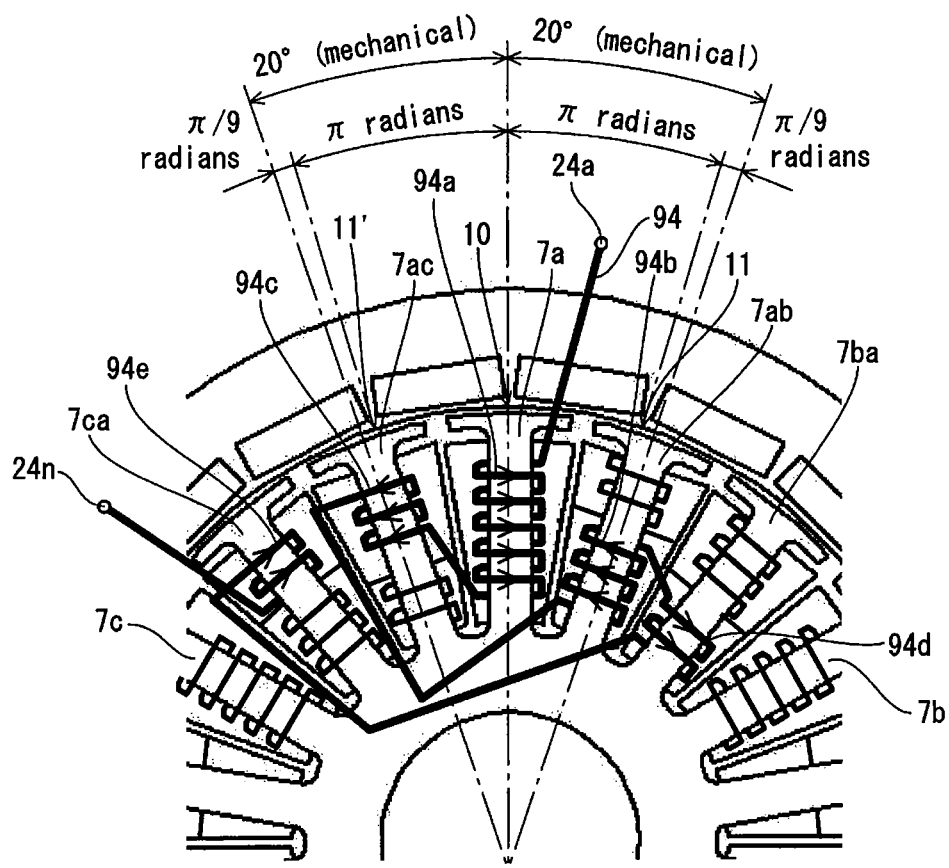
FIG. 6 shows a detailed diagram of the synchronous electric motor pertaining to Embodiment 2 of the present invention.

FIG. 6 is a detailed diagram of the synchronous electric motor pertaining to Embodiment 2 of the present invention.

The point of difference from Embodiment 1 lies in the order in which the coils are connected and wound around the stator teeth. In FIG. 6, the detailed structure of the U-phase stator coil 94 is described. The stator coil 94 extends from the end portion 24a, which is connected to a U-phase input terminal, to the end portion 24n, which is connected to a neutral point, and comprises the coils 94a, 94c, 94b, 94d, and 94e, connected in that order. In the present Embodiment, the structure is such that the stator tooth around which only one stator coil is wound is located nearest the input terminal of the stator coil.

Figure 7:
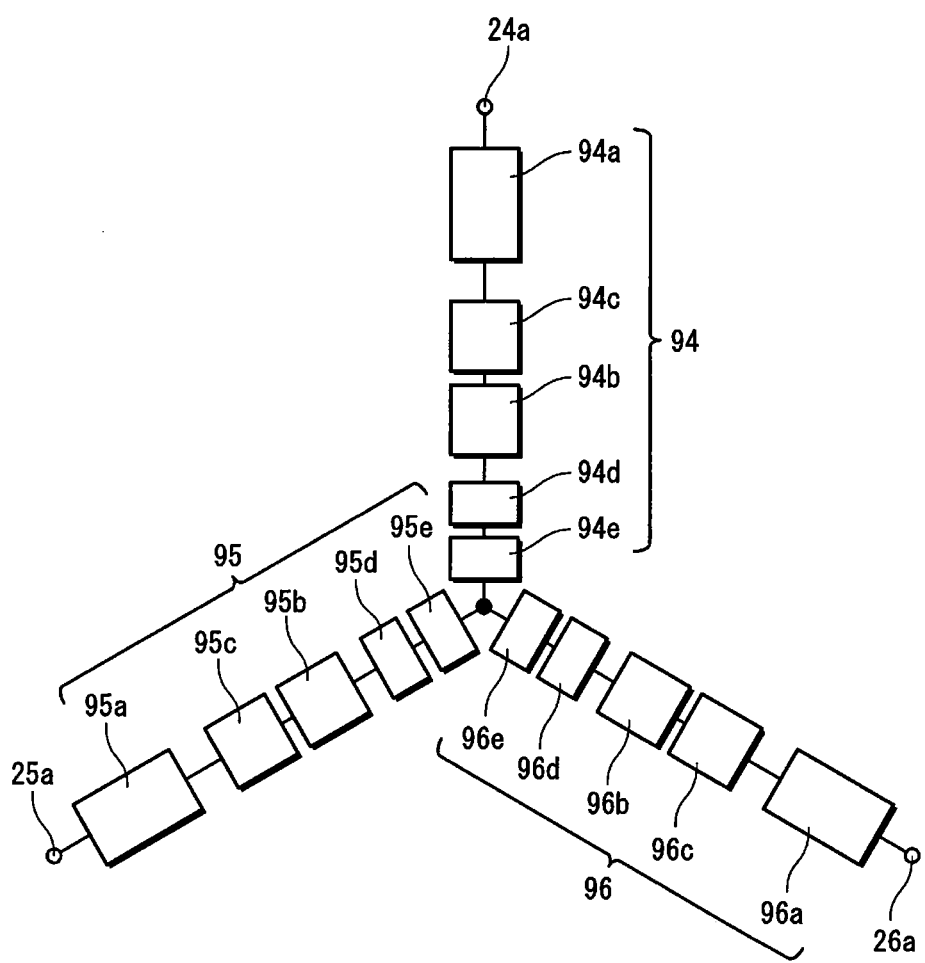
FIG. 7 shows a coil diagram for the synchronous electric motor pertaining to Embodiment 2 of the present invention.

FIG. 7 is a coil diagram for the synchronous electric motor pertaining to Embodiment 2 of the present invention.

Within the U-phase stator coil 94, the coil 94a is wound around a stator tooth around which only that coil is wound, and the coils 94*b*, 94*c*, 94*d*, and 94*e* are each wound around stator teeth around which a plurality of coils are wound.

Similarly, within the V-phase stator coil 95, the coil 95*a* is wound around a stator tooth around which only that coil is wound, and the coils 95*b*, 95*c*, 95*d*, and 95*e* are each wound around stator teeth around which a plurality of coils are wound. Also, within the W-phase stator coil 96, the coil 96*a* is wound around a stator tooth around which only that coil is wound, and the coils 96*b*, 96*c*, 96*d*, and 96*e* are each wound around stator teeth around which a plurality of coils are wound.

As shown in FIG. 7, each input terminal is connected to a coil wound around a stator tooth around which only one coil is wound, namely the coils 94*a*, 95*a*, and 96*a*. The coils 94*a*, 95*a*, and 96*a* have comparatively more loops than the other coils, and the difference in potential between the two ends of such coils is thus greater than that found in coils with fewer loops.

By winding a coil in only one phase around a single stator tooth, greater reliability is achieved in inter-phase insulation from coils in other phases wound around other stator teeth. By the same token, when coils of more than one phase are wound around a single stator tooth, the inter-phase insulation in the plurality of coils is made more complex.

Therefore, in order to enhance the reliability of inter-phase insulation between coils of more than one phase that are wound around a single stator tooth, coils wound around a single stator tooth around which coils of more than one phase are wound are connected near the neutral point. Also, in order to enhance the reliability of inter-phase insulation in coils in only one phase wound around a single stator tooth, coils wound around a single stator tooth around which only a coil in a single phase is wound are connected near the input terminal.

It should be noted that, in view of the above-stated aim, the connection order of the coils 94*c*, 94*b*, 94*d*, and 94*e* may be altered.

According to the above Embodiment, in addition to the effects of Embodiment 1, the reliability of inter-phase insulation can be enhanced between coils in multiple phases.

[Embodiment 3]

Embodiment 3 differs from Embodiment 1 in that Embodiment 3 is a synchronous electric motor with 8q dipoles to 9q teeth (where q is a positive integer).

(General Configuration)

Figure 8:
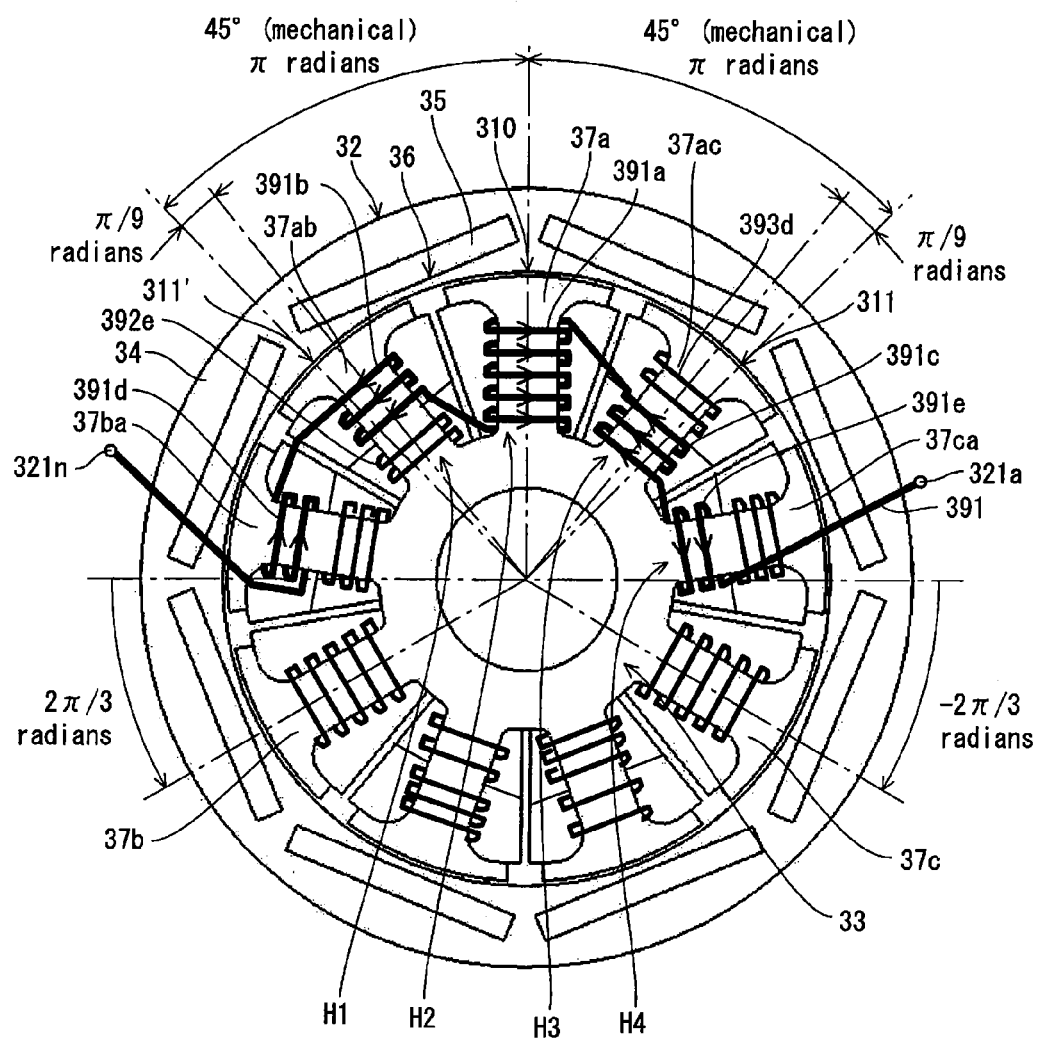
FIG. 8 shows a plan view of the synchronous electric motor pertaining to Embodiment 3 of the present invention.

FIG. 8 is a plan view of the synchronous electric motor pertaining to Embodiment 3 of the present invention.

The synchronous electric motor 31 comprises a rotor 32 and a stator 33,

The rotor 32 includes a rotor core 34 and eight permanent magnets 35. The permanent magnets 35 are arranged along the rotor core 34 in the circumferential direction of the rotor at equally-spaced intervals. The permanent magnets 35 comprise magnetic dipoles 36 which are arranged so that alternating north and south magnetic poles face the stator 33. A pair of north and south magnetic poles forms an electrical angle of $2\pi$ radians, and the interval between neighboring magnetic dipoles is the electrical angle $\pi$ radians. In the present Embodiment, the rotor has eight magnetic dipoles, and the relationship of the electrical angle to the mechanical angle is four-fold.

The stator 33 includes nine stator teeth 37 which are arranged to face the rotor 32. Given eight magnetic dipoles and nine stator teeth, the stator teeth 37 are arranged circumferentially and offset by a factor of 8/9 per circle. Coils are wound around each of the stator teeth 37.

The rotor inter-polar gaps 310 and 311 represent the positions of magnetic neutral points between north magnetic poles and south magnetic poles of the permanent magnets arranged on the rotor. Such positions are also mechanically located in the gap between two magnets. Inter-polar gaps where a north pole is followed by a south pole when progressing counterclockwise are shown as 311, and inter-polar gaps where a south pole is followed by a north pole when progressing counterclockwise are shown as 310. It should be noted that 311' is at an electrical angle of $2\pi$ radians from the inter-polar gap 311 and, due to repetition of a pair of magnetic dipoles, indicates the same position in terms of electrical angle but a different position in terms of mechanical angle.

Each of the stator teeth 37*a*, 37*b*, and 37*c* is a stator tooth around which is wound only a main coil. These stator teeth are arranged at equally-spaced intervals every mechanical angle of 120°.

FIG. 8 shows a situation in which the axis of the stator tooth 37*a* and the rotor inter-polar gap 310 coincide and face each other. Additionally, taking the counterclockwise direction as positive, the positional relationship between the axis of the stator tooth 37*b* and the rotor inter-polar gaps is such that they are misaligned by a mechanical angle of 120° or an electrical angle of +2π/3 radians. Also, the positional relationship between the axis of the stator tooth 37*c* and the rotor inter-polar gaps is such that they are misaligned by a mechanical angle of −120°, or an electrical angle of −2π/3 radians. Accordingly, the stator teeth 37*a*, 37*b*, and 37*c* are each spaced apart by 2π/3 radians, in terms of electrical angle.

(Stator Teeth Group Structure)

Next, the structure of the stator teeth groups is explained. The nine stator teeth 37 form stator teeth groups with three individual stator teeth lined up circumferentially forming one group. A total of three stator teeth groups so structured are arranged at equally-spaced intervals every mechanical angle of 120°.

For example, one stator teeth group comprises the reference stator tooth 37*a*, which demonstrates a phase relationship with the rotor, as well as the neighboring stator teeth 37*ab* and 37*ac*. The stator tooth 37*ab* is situated π/9 radians behind the position offset by π radians from the stator tooth 37*a*, and the stator tooth 37*ac* is situated π/9 radians ahead of the position offset by π radians from the stator tooth 37*a*, all in terms of electrical angle.

In addition, only the main coil 391 is wound around the stator coil 37*a*. The main coil 391*b* and the sub-coil 392*e* are both wound around the stator tooth 37*ab*, and the main coil 391*c* and the sub-coil 393*d* are both wound around the stator tooth 37*ac*. The stator tooth 37*ab* is flanked by the reference stator teeth 37*a* and 37*b*, which demonstrate a phase relationship with the rotor. However, because the phase of the stator tooth 37*a* is comparatively closer to that of the stator tooth 37*ab* than is the phase of stator tooth 37*b* to which π radians have been added, the stator tooth 37*ab* belongs to the same stator teeth group as the stator tooth 37*a*. Additionally, the stator tooth 37*ac* is flanked by the reference stator teeth 37*a* and 37*c*, which demonstrate a phase relationship with the rotor. However, because the phase of the stator tooth 37*a* is comparatively closer to that of the stator tooth 37*ac* than is the phase of the stator tooth 37*c* to which π radians have been added, the stator tooth 37*ac* thus belongs to the same stator teeth group as the stator tooth 37*a*.

(Stator Coil Structure)

The structure of the stator coils is explained next. Taking the example shown in FIG. 8, the stator coil 391 comprises the stator coils 391*a*, 391*b*, 391*c*, 391*d*, and 391*e*, which all are serially connected. The end portion 321*a* of the stator coil 391 is connected to a U-phase input terminal, and the end portion 321n of the stator coil 391 is connected to a neutral point.

(Stator Teeth-Produced Magnetic Fields)

The vector diagram shown in FIG. 3 is also applicable to the present Embodiment. The magnetic fields produced by the stator teeth are explained using FIGS. 8 and 3.

The synchronous electric motor 31 is a three-phase synchronous electric motor, and the phase difference between the U-phase, V-phase, and W-phase current is an electrical angle of $2\pi/3$ radians. N1 loops of the U-phase coil 391 are wound in a first direction around the stator tooth 37a (FIG. 8, H2). When the U-phase current reaches a maximum, the vector of magnetic field produced by the current flowing in the U-phase coil 391 of the stator tooth 37a is shown as H2 in FIG. 3.

N112 loops of the U-phase coil 391 are wound in a second direction, which is the opposite of the first direction, around the stator tooth 37ab (FIGS. 8, H1), and N212 loops of the V-phase coil 392 are also wound therearound. When the U-phase current reaches a maximum, the vector of the magnetic field produced by the current flowing in the U-phase coil 391 of the stator tooth 37ab is shown as –U2 in FIG. 3, and the vector of the magnetic field produced by the current flowing in the V-phase coil 392 of the stator tooth 37ab is shown as V3 in FIG. 3. The vector of the magnetic field obtained by combining the two is shown as H1 in FIG. 3.

N113 loops of the U-phase coil 391 are wound in the second direction around the stator tooth 37ac (FIGS. 8, H3), and N313 loops of the W-phase coil 393 are also wound therearound. When the U-phase current reaches a maximum, the vector of the magnetic field produced by the current flowing in the U-phase coil 391 of the stator tooth 37ac is shown as –U2 in FIG. 3, and the vector of the magnetic field generated by the current flowing in the W-phase coil 393 of the stator tooth 37ac is shown as W3 in FIG. 3. The vector of the magnetic field obtained by combining the two is shown as H3 in FIG. 3.

Here,

A=number of magnetic dipoles (A is an integer, A≧2)=8,
B=number of stator teeth (B is a multiple of 3, B≠A)=9,
P=number of magnetic dipole pairs (P=A/2)=4, and
k=number of stator teeth per phase (k=B/3)=3.

Given that the motor is driven with three-phase current that has a phase difference of $2\pi/3$ radians in terms of electrical angle, the coil coefficient α can be calculated according to the equation below.

$$\alpha = |2\pi/A - 2\pi/B| \cdot P$$
$$= |2\pi/8 - 2\pi/9| \cdot 4$$
$$= \pi/9 \text{ radians}$$

If the number of loops of the U-phase coil 391 wound around the stator tooth 37a is N1, then the number of loops wound around the stator tooth 7ab, N112 for the U-phase coil 91 and N212 for the V-phase coil 92, is given as follows.

$$N112 \approx (N1) \cdot [\sin(\pi/3 - \pi/9)/\sin(\pi/3)]$$
$$\approx (N1) \cdot [\sin(2\pi/9)/\sin(\pi/3)]$$
$$N212 \approx (N1) \cdot [\sin(\pi/9)/\sin(\pi/3)]$$

If the number of loops of each coil is adjusted as such, then the magnetic field H1 produced by the stator tooth 37ab has approximately the same magnitude as the magnetic field H2 produced by the stator tooth 37a but is oriented in the opposite direction as the magnetic field H2 produced by the stator tooth 37a (offset by π radians) and is additionally in a phase that is ahead by an electrical angle of π/9 radians.

Also, the number of loops wound around the stator tooth 37ac, N113 for the U-phase coil 391 and N313 for the W-phase coil 393, is given as follows.

$$N113 \approx (N1) \cdot [\sin(\pi/3 - \pi/9)/\sin(\pi/3)]$$
$$\approx (N1) \cdot [\sin(2\pi/9)/\sin(\pi/3)]$$
$$N313 \approx (N1) \cdot [\sin(\pi/9)/\sin(\pi/3)]$$

If the number of loops of each coil is adjusted as such, then the magnetic field H3 produced by the stator tooth 37ac has approximately the same magnitude as the magnetic field H2 produced by the stator tooth 37a but is oriented in the opposite direction as the magnetic field H2 produced by the stator tooth 37a (offset by π radians) and is additionally in a phase that is behind by an electrical angle of π/9 radians.

In FIG. 8, the stator tooth 37ab is located π/9 radians behind a position offset by π radians from the stator tooth 37a, in terms of electrical angle. Given this positional relationship for the stator tooth 37ab, then in terms of electrical angle, the magnetic field H1 is produced π/9 radians ahead of a position π radians from the magnetic field H2, and thus when the axis of the stator tooth 37ab and the rotor inter-polar gap 311' coincide, a magnetic field at maximum magnitude is produced by the stator tooth 37ab. Additionally, a magnetic field at maximum magnitude can also be produced by the stator tooth 37a when the axis of the stator tooth 37a and the rotor inter-polar gap 310 coincide.

Also, in FIG. 8, the stator tooth 37ac is located π/9 radians ahead of a position offset by π radians from the stator tooth 37a, in terms of electrical angle. Given this positional relationship for the stator tooth 37ac, then in terms of electrical angle, the magnetic field H3 is produced π/9 radians behind a position π radians from the magnetic field H2, and thus when the axis of the stator tooth 37a and the rotor inter-polar gap 310 coincide, a magnetic field at maximum magnitude is produced by the stator tooth 37a. Additionally, a magnetic field at maximum magnitude can also be produced by the stator tooth 37ac when the axis of the stator tooth 37ac and the rotor inter-polar gap 311 coincide.

As shown, in the present Embodiment, when the axes of the stator teeth and the rotor inter-polar gaps coincide, the stator teeth-produced magnetic fields are at maximum magnitude, and so the magnetic torque produced by each of the stator teeth is also maximized, which can in turn increase the total torque. Also, the torque produced by each of the stator teeth is nearly uniform, which can reduce torque rippling.

The structure of the present Embodiment has eight dipoles and nine teeth, yet the same effects can be obtained from a structure that has 16 dipoles and 18 teeth. It should be noted that for 16 dipoles and 18 teeth, the arrangement will feature symmetry with respect to the U-phase, V-phase, and W-phase, and as such, the combined attractive force in the radial direction due to stator teeth with coils through which current is flowing is zero, with no influence from magnetic attractive force on the rotor. Accordingly, negative influences affecting the bearing life are removed and a longer-lasting synchronous electric motor can be produced. Similarly, an arrangement with 24 dipoles and 27 teeth will have a U-phase, a V-phase, and a W-phase arranged in three sets arranged apart by a mechanical angle of 120°, and as such, the combined attractive force in the radial direction due to stator teeth with coils through which current is flowing is zero, and magnetic attractive force does not influence the rotor.

[Embodiment 4]

Embodiment 4 differs from Embodiment 1 in that Embodiment 4 is a synchronous electric motor with 10q dipoles to 12q teeth (where q is a positive integer).

(General Configuration)

Figure 9:
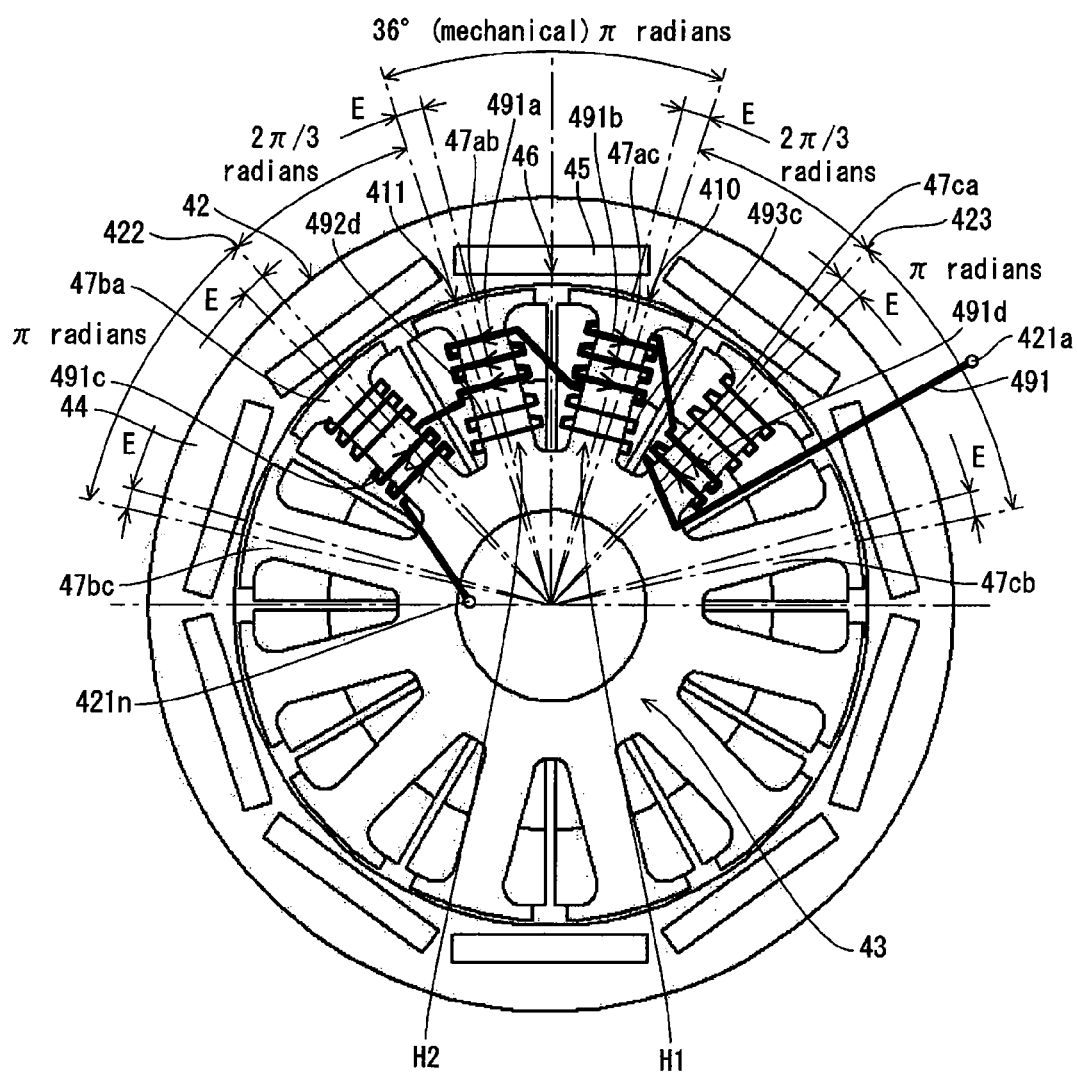
FIG. 9 shows a plan view of the synchronous electric motor pertaining to Embodiment 4 of the present invention.

FIG. 9 is a plan view of the synchronous electric motor pertaining to Embodiment 4 of the present invention.

The synchronous electric motor 41 comprises a rotor 42 and a stator 43,

The rotor 42 includes a rotor core 44 and 10 permanent magnets 45. The permanent magnets 45 are arranged along the rotor core 44 in the circumferential direction of the rotor at equally-spaced intervals. The permanent magnets 45 comprise magnetic dipoles 46 which are arranged so that alternating north and south magnetic poles face the stator 43. A pair of north and south magnetic poles forms an electrical angle of $2\pi$ radians, and the interval between neighboring magnetic dipoles is the electrical angle $\pi$ radians. In the present Embodiment, the rotor has 10 magnetic dipoles, and the relationship of the electrical angle to the mechanical angle is five-fold.

The stator 43 includes 12 stator teeth 47 which are arranged to face the rotor 42. Given 10 magnetic dipoles and 12 stator teeth, the stator teeth 47 are arranged circumferentially and offset by a factor of 5/6 per semicircle. Coils are wound around each of the stator teeth 47.

The rotor inter-polar gaps 410 and 411 represent the positions of magnetic neutral points between north magnetic poles and south magnetic poles of the permanent magnets arranged on the rotor. Such positions are also mechanically located in the gap between two magnets. Inter-polar gaps where a north pole is followed by a south pole when progressing counterclockwise are shown as 411, and inter-polar gaps where a south pole is followed by a north pole when progressing counterclockwise are shown as 410. Concentrated coils are wound around each of the stator teeth so that each has a respective main coil and sub-coil.

The U-phase coils 491a and 491b have more loops wound around the stator teeth 47ab and 47ac than do coils in other phases. Taking the counterclockwise direction as positive, when the stator tooth 47ac is located $\pi/12$ radians ahead of the rotor inter-polar gap 410, the stator tooth 47ab is located $\pi/12$ radians behind the rotor inter-polar gap 411, in terms of electrical angle.

In addition, the stator tooth 47ba is located $\pi/12$ radians further ahead of the position 422, which is $2\pi/3$ radians ahead of the rotor inter-polar gap 411, and the stator tooth 47bc is located $\pi/12$ radians behind a position offset by $\pi$ radians from the position 422, all in terms of electrical angle.

Additionally, the stator tooth 47ca is located $\pi/12$ radians further behind the position 423, which is $2\pi/3$ radians behind the rotor inter-polar gap 410, and the stator tooth 47cb is located $\pi/12$ radians ahead of a position offset by $\pi$ radians from the position 423, all in terms of electrical angle.

Accordingly, with respect to the stator teeth 47ac and 47ab, the stator teeth 47ba and 47bc as well as the stator teeth 47cb and 47ca are equally spaced and located at an electrical angle of $2\pi/3$ radians away.

(Stator Teeth Group Structure)

Next, the structure of the stator teeth groups is explained. The 12 stator teeth 47 form stator teeth groups with two individual stator teeth lined up circumferentially forming one group. Within one stator teeth group, the reference stator tooth demonstrating a phase relationship with the rotor is the stator tooth with the most loops in its main coil. Taking the stator teeth group comprising the stator teeth 47ab and 47ac as one example, the reference stator teeth are the stator teeth 47ab and 47ac. As shown in FIG. 9, the stator tooth 47ac and the stator tooth 47ab are each offset by $\pi/12$ radians from the inter-polar interval of $\pi$ radians.

(Stator Coil Structure)

The structure of the stator coils is explained next. Taking the example shown in FIG. 9, the stator coil 491 comprises the coils 491a, 491b, 491c, and 491d, which are all serially connected. The end portion 421a of the stator coil 491 is connected to a U-phase input terminal, and the end portion 421n of the stator coil 491 is connected to a neutral point.

(Stator Teeth-Produced Magnetic Fields)

Figure 10:
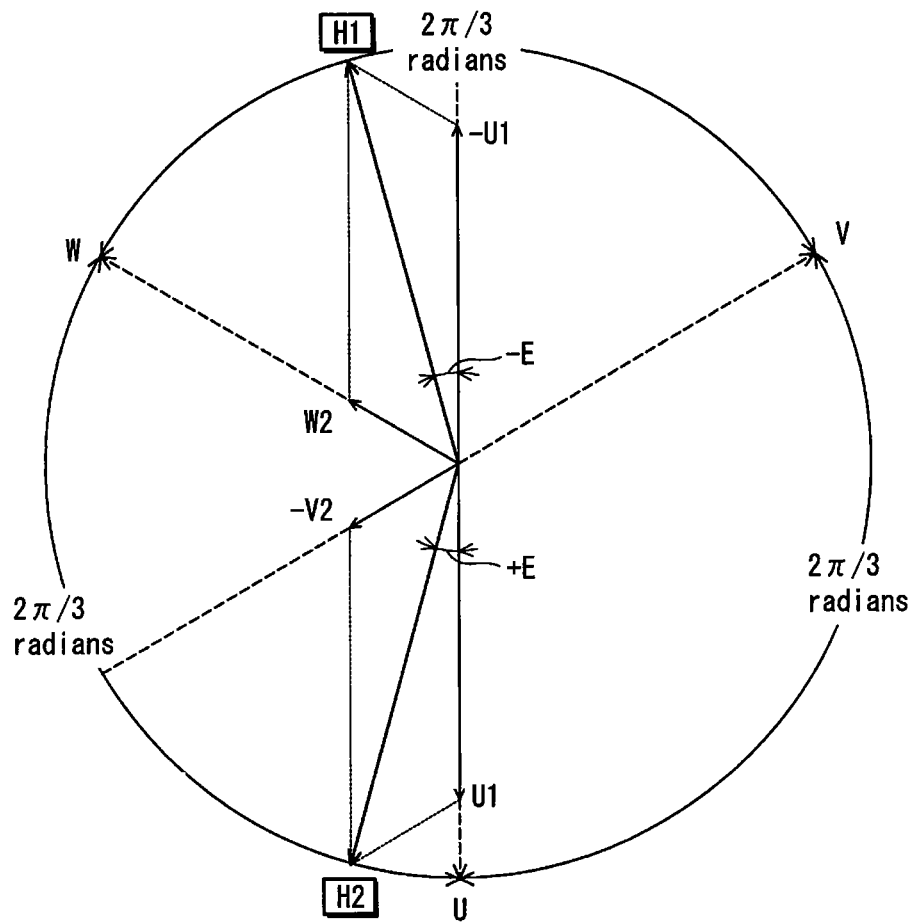
FIG. 10 shows a vector diagram of the magnitudes and phases of the magnetic fields pertaining to Embodiment 4 of the present invention.

FIG. 10 is a vector diagram that shows the magnitudes and phases of the magnetic fields pertaining to Embodiment 4 of the present invention. The magnetic fields produced by the stator teeth are explained using FIGS. 9 and 10.

The synchronous electric motor 41 is a three-phase synchronous electric motor, and the phase difference between the U-phase, V-phase, and W-phase of the current is an electrical angle of $2\pi/3$ radians. N112 loops of the U-phase coil 491 are wound in a first direction around the stator tooth 47ab (FIGS. 9, H2), and N212 loops of the V-phase coil 492 are also wound therearound. When the U-phase current reaches a maximum, the vector of the magnetic field produced by the current flowing in the U-phase coil 491 of the stator tooth 47ab is shown as U1 in FIG. 10, and the vector of the magnetic field produced by the current flowing in the V-phase coil 492 of the stator tooth 47ab is shown as −V2 in FIG. 10. The vector of the magnetic field obtained by combining the two is shown as H2 in FIG. 10.

N113 loops of the U-phase coil 491 are wound in a second direction around the stator tooth 47ac (FIGS. 9, H1), and N313 loops of the W-phase coil 493 are wound therearound. When the U-phase current reaches a maximum, the vector of the magnetic field produced by the current flowing in the U-phase coil 491 of the stator tooth 47ac is shown as −U1 in FIG. 10, and the vector of the magnetic field produced by the current flowing in the W-phase coil 493 of the stator tooth 47ac is shown as W2 in FIG. 10. The vector of the magnetic field obtained by combining the two is shown as H1 in FIG. 10.

Here,

A=number of magnetic dipoles (A is an integer, A≧2)=10,
B=number of stator teeth (B is a multiple of 3, B≠A)=12,
P=number of magnetic dipole pairs (P=A/2)=5, and
k=number of stator teeth per phase (k not a multiple of 3, k=B/3)=4.

Given that the motor is driven with three-phase current that has a phase difference of $2\pi/3$ radians in terms of electrical angle, the coil coefficient α can be calculated according to the equation below.

$$\alpha = |2\pi/A - 2\pi/B| \cdot P/2$$
$$= |2\pi/10 - 2\pi/12| \cdot 5/2$$
$$= \pi/12 \text{ radians}$$

If the number of loops wound around the stator tooth 47ab is N112 for the U-phase coil 491 and N212 for the V-phase coil 492, then the following relation holds.

$$N1 = N112 + N212$$
$$N112 \approx (N1) \cdot [\sin(\pi/3 - \pi/12)/\sin(\pi/3)]$$
$$\approx (N1) \cdot [\sin(\pi/4)/\sin(\pi/3)]$$
$$N212 \approx (N1) \cdot [\sin(\pi/12)/\sin(\pi/3)]$$

If the number of loops of each coil is adjusted as such, then the magnetic field H2 produced by the stator tooth 47ab is in a phase that is ahead of the U-phase by an electrical angle of π/12 radians.

If the number of loops wound around the stator tooth 47ac is N113 for the U-phase coil 491 and N313 for the W-phase coil 493, then the following relation holds.

$$N1 = N113 + N313$$
$$N113 \approx (N1) \cdot [\sin(\pi/3 - \pi/12)/\sin(\pi/3)]$$
$$\approx (N1) \cdot [\sin(\pi/4)/\sin(\pi/3)]$$
$$N313 \approx (N1) \cdot [\sin(\pi/12)/\sin(\pi/3)]$$

If the number of loops of each coil is adjusted as such, then the magnetic field H1 produced by the stator tooth 47ac is in a phase that is behind the −U-phase by an electrical angle of π/12 radians.

In FIG. 9, the stator tooth 47ac is located π/12 radians ahead of the rotor inter-polar gap 410, in terms of electrical angle. Given this positional relationship for the stator tooth 47ac, the magnetic field H1 is produced π/12 radians behind the −U-phase, and thus when the axis of the stator tooth 47ac and the rotor inter-polar gap 410 coincide, a magnetic field at maximum magnitude is produced by the stator tooth 47ac.

Also, in FIG. 9, the stator tooth 47ab is located π/12 radians behind the rotor inter-polar gap 411, in terms of electrical angle. Given this positional relationship for the stator tooth 47ab, the magnetic field H2 is produced π/12 radians ahead of the U-phase, and thus when the axis of the stator tooth 47ab and the rotor inter-polar gap 411 coincide, a magnetic field at maximum magnitude is produced by the stator tooth 47ab.

As shown, in the present Embodiment, when the axes of the stator teeth and the rotor inter-polar gaps coincide, the magnetic fields produced by each of the stator teeth are at maximum magnitude, and so the magnetic torque produced by each of the stator teeth is also maximized, which can in turn increase the total torque. Also, the torque produced by each of the stator teeth is nearly uniform, which can reduce torque rippling.

While the structure of the present Embodiment has 10 dipoles and 12 teeth, a structure with 20 dipoles and 24 teeth may also be used to obtain the same effects. For 10q dipoles and 12q teeth, the arrangement has axial symmetry with respect to the U-phase, V-phase, and W-phase. Therefore, the combined attractive force in the radial direction owing to stator teeth with coils through which current is flowing is zero, with no influence from magnetic attractive force on the rotor. Accordingly, negative influences on bearing life are removed, and a longer-lasting synchronous electric motor can be obtained.

The synchronous electric motor pertaining to the present invention has been explained above according to the Embodiments. However, the present invention is not limited in this matter. For instance, the following Variations are also plausible.

Figure 11:
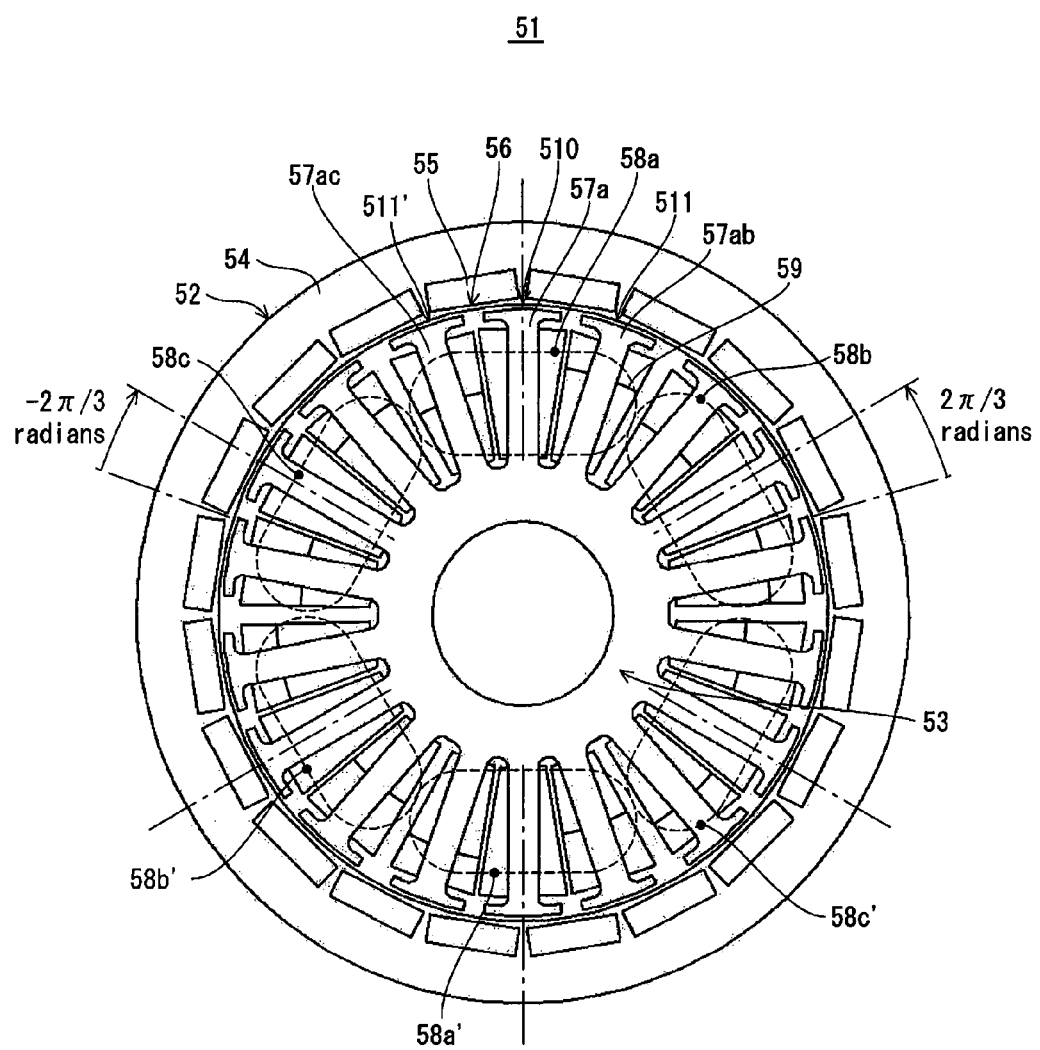
FIG. 11 shows a plan view of the synchronous electric motor pertaining to Variation 1 of the present invention.
Figure 12:
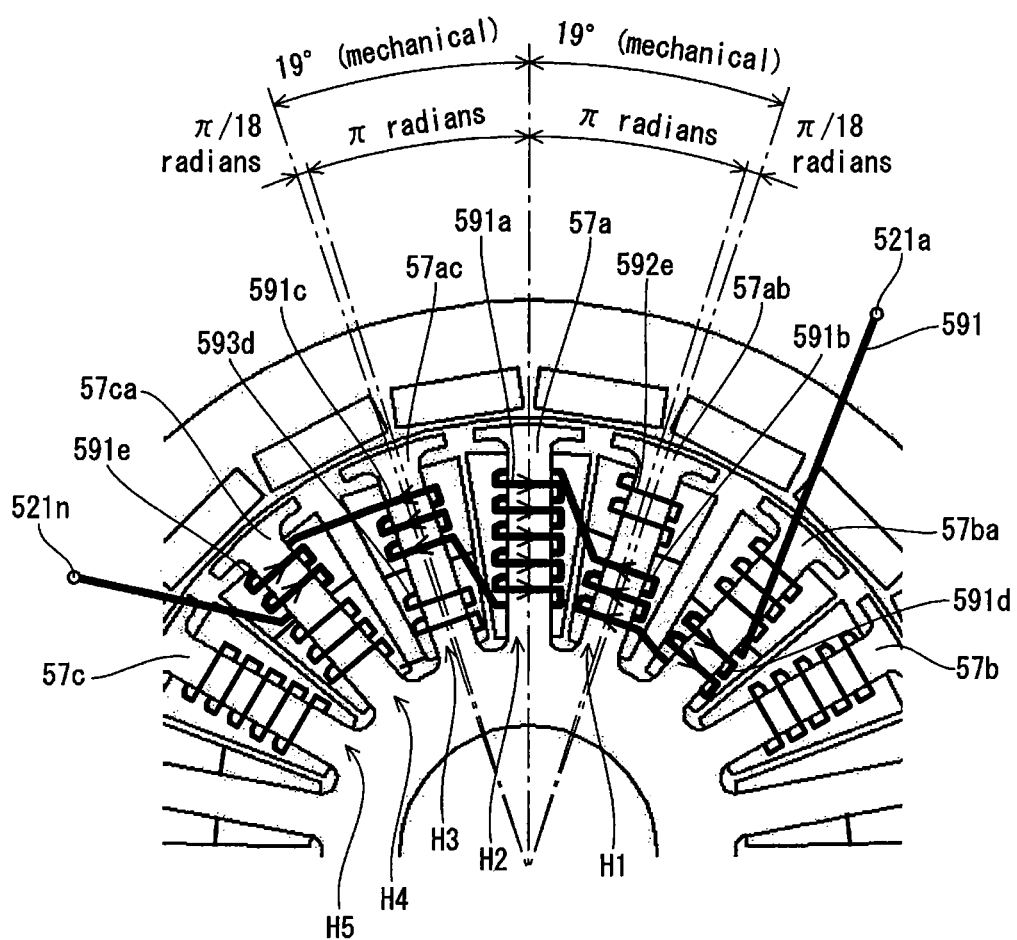
FIG. 12 shows a detailed diagram of the synchronous electric motor of FIG. 11.

(1) In the Embodiments, multiple stator teeth are arranged at equal intervals in the circumferential direction of the stator. However, the present invention is not limited in this manner; the intervals need not be equal. FIGS. 11 and 12 show the structure of a synchronous electric motor with 20 dipoles and 18 teeth in which the stator teeth are not arranged at equal intervals.

The synchronous electric motor 51 has stator teeth groups 58 with three individual stator teeth lined up circumferentially forming one group. The plurality of stator teeth groups 58 so structured are arranged at equally-spaced intervals every mechanical angle of 60°. Also, within each of the stator teeth groups, the three stator teeth are equally spaced at a mechanical angle of 19°. As such, for example, the angle between the stator tooth 57ab and the stator tooth 57ba is a mechanical angle of 22°, which differs from the angle between stator teeth of the same stator teeth group (a mechanical angle of) 19° (see FIG. 12). The phases of the magnetic fields for the synchronous electric motor 51 are shown in FIG. 13.

Figure 13:
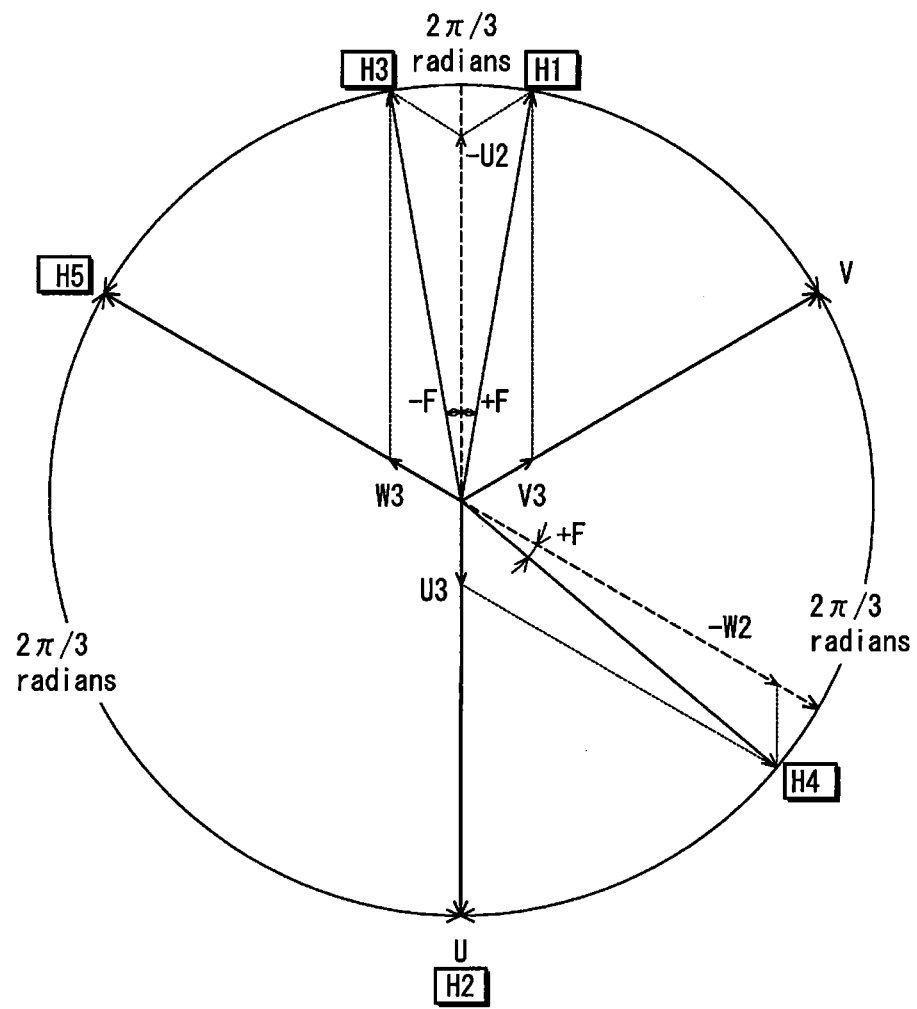
FIG. 13 shows a vector diagram of the magnitudes and phases of the magnetic fields pertaining to Variation 1 of the present invention.

To realize the magnetic field phases shown in FIG. 13, the following relation, where the number of loops of the U-phase coil 591 wound around the stator tooth 57a is N1, and the number of loops wound around the stator tooth 57ab is N112 for the U-phase coil 591 and is N212 for the V-phase coil 592, must hold.

$$N112 \approx (N1) \cdot [\sin(\pi/3 - \pi/18)/\sin(\pi/3)]$$
$$\approx (N1) \cdot [\sin(5\pi/18)/\sin(\pi/3)]$$
$$N212 \approx (N1) \cdot [\sin(\pi/18)/\sin(\pi/3)]$$

In addition, the following relation, where the number of loops wound around the stator tooth 57ac is N113 for the U-phase coil 591 and is N313 for the W-phase coil 593, must hold.

$$N113 \approx (N1) \cdot [\sin(\pi/3 - \pi/18)/\sin(\pi/3)]$$
$$\approx (N1) \cdot [\sin(5\pi/18)/\sin(\pi/3)]$$
$$N313 \approx (N1) \cdot [\sin(\pi/18)/\sin(\pi/3)]$$

Then, when the axes of the stator teeth and the rotor inter-polar gaps coincide, the stator teeth-produced magnetic fields are at maximum magnitude, and so the magnetic torque produced by each of the stator teeth is also maximized, which can in turn increase the total torque. Also, the torque produced by each of the stator teeth is nearly uniform, which can reduce torque rippling.

(2) In the Embodiments, structures featuring 10q dipoles to 9q teeth, 8q dipoles to 9q teeth, and 10q dipoles to 12q teeth (where q is a positive integer) were discussed. However, the present invention is not limited to the combinations of dipole number and teeth number given above; other combinations are also possible. For example, as shown in FIG. 14, a structure featuring 16q dipoles to 15q teeth may also be used.

Figure 14:
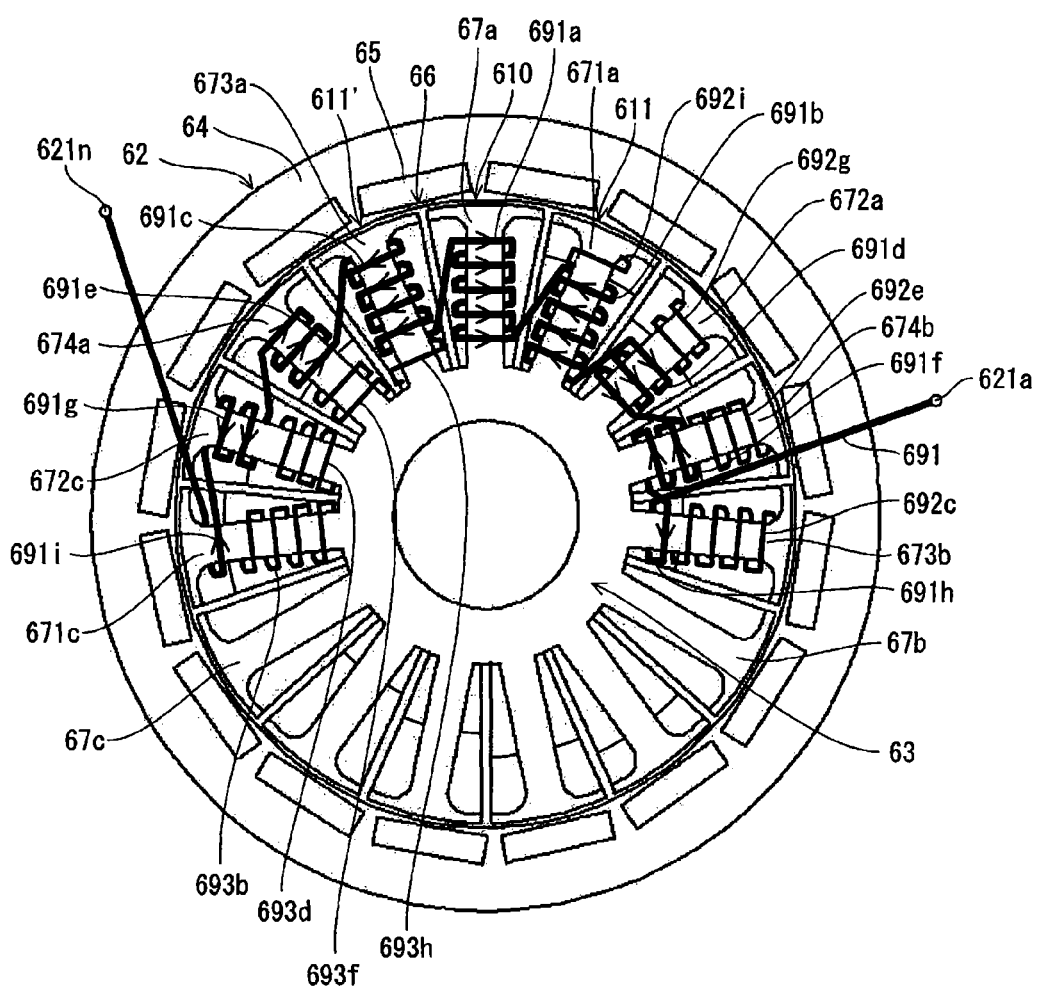
FIG. 14 shows a plan view of the synchronous electric motor pertaining to Variation 2 of the present invention.

FIG. 14 shows the synchronous electric motor 61, in which 15 stator teeth are arranged circumferentially at equal intervals with five lined up stator teeth comprising one stator teeth group. Neighboring stator teeth are located π radians apart and further offset by π/15 radians. For example, the stator tooth 671a is located a further π/15 radians behind a position π radians behind the stator tooth 67a. Also, the stator tooth 672a is located a further π/15 radians ahead of a position π radians ahead of the stator tooth 671*a*. That is, the stator tooth 672*a* is located 2π/15 radians behind the stator tooth 67*a*. All of the above is given in terms of electrical angle.

In addition, a stator coil in one phase comprises five main coils and four sub-coils, all serially connected. For instance, the U-phase stator coil 691 comprises the coils 691*a*, 691*b*, 691*c*, 691*d*, 691*e*, 691*f*, 691*g*, 691*h*, and 691*i*, all serially connected.

It should be noted that the ratio of main coils to sub-coils wound around each stator tooth is such that phase differences with respect to reference stator teeth are cancelled out. As such, when the axes of the stator teeth and the rotor inter-polar gaps coincide, the magnetic fields produced by each of the stator teeth are at maximum magnitude, and thus the magnetic torque produced by each of the stator teeth is maximized, which in turn can increase the total torque. Also, the torque produced by each of the stator teeth is nearly uniform, which can reduce torque rippling.

(3) In the Embodiments, as shown for example in FIG. 3, the magnetic field indicated as H1 is created by combination of a vector in the −U direction (−U2) and a vector in the +V direction (V3). However, there is no need to limit the invention in this manner. For instance, the magnetic field indicated as H1 may also be created by combination of a vector in the −U direction and a vector in the −W direction. Also, in the Embodiments, the main coils of neighboring stator teeth in each stator teeth group are wound in opposite directions. However, the invention need not be limited in this manner. The main coils may be wound in the same direction and any given vector may be created by adjusting the coil ratio of the main coils and sub-coils.

(4) The Embodiments give examples of three-phase synchronous electric motors, yet the present invention is also applicable to five-phase, seven-phase, or other poly-phase synchronous electric motors.

(5) In the Embodiments, the stator coils are wound around the stator teeth, yet the present invention is not limited in this manner and is also applicable to motors with no teeth, i.e. to coreless motors.

(6) While not particularly noted in the Embodiments, the stator coils may be given a skew position that progresses in the axial direction of the rotor up to the maximum spacing of the stator coils in the circumferential direction.

(7) In the Embodiments, outer rotor synchronous electric motors, in which the rotor is arranged on the outside of the stator, are described. However, it ought to go without saying that the same effects may be obtained using other types of synchronous electric motors, such as inner rotor synchronous electric motors, in which the rotor is arranged inside the stator, axial gap synchronous electric motors, in which the rotor and stator are arranged so as to face each other and form an axial gap, or synchronous electric motors with a structure combining a plurality of the above.

(8) In the Embodiments, the magnetic dipoles in the rotor are provided by permanent magnets, yet the present invention is also applicable to synchronous electric motors that use reluctance torque due to a difference in magnetic reluctance, as well as to synchronous electric motors with rotors using a combination of these.

(9) The present invention is not limited to synchronous electric motors but is also applicable to synchronous generators and to linear synchronous motors as well as linear synchronous generators.

(10) The present invention can provide a compact, high-output, low-vibration, low-noise, high-efficiency synchronous electric motor, and is especially useful for vehicles in which a low-vibration, low-noise motor is desirable.

INDUSTRIAL APPLICABILITY

The present invention is applicable to synchronous electric motors for use in compressors, electric vehicles, hybrid vehicles, fuel-cell vehicles, and the like wherever compact high-efficiency motors with low vibration and low noise are desired.

REFERENCE SIGNS LIST

1, 31, 41, 51, 61 synchronous electric motor
2, 32, 42, 52, 62 rotor
3, 33, 43, 53, 63 stator
4, 34, 44, 54, 64 rotor core
5, 35, 45, 55, 65 permanent magnets
6, 36, 46, 56, 66 magnetic dipoles
7, 37, 47, 57, 67 stator teeth
8, 58 stator teeth groups
9, 59 stator coils
91, 92, 93, 94, 95, 96 stator coils
391, 491, 591, 691 stator coils

The invention claimed is:

1. A synchronous electric motor, comprising:
a rotor having a plurality of radially-oriented magnetic dipoles distributed circumferentially along a rotation direction of the rotor at equal intervals; and
a stator having a plurality of stator teeth arranged circumferentially along the rotation direction of the rotor, wherein
the plurality of stator teeth form stator teeth groups, each of the stator teeth groups including a predetermined number of consecutive stator teeth and the stator teeth groups being arranged at equal intervals,
a plurality of sets of the stator teeth groups are formed such that any one stator teeth group in each set is in a same position in terms of electrical angle as one stator teeth group in any other set, so that the sets of consecutive stator teeth groups have rotational symmetry about a rotation axis of the rotor,
for each of the stator teeth groups, the predetermined number of stator teeth included therein are arranged at intervals different from the intervals of the magnetic dipoles of the rotor,
a main coil is wound around each of the predetermined number of stator teeth and a sub-coil is further wound around each of one or more stator teeth among the predetermined number of stator teeth,
coils in a first phase are constituted by, in series, (i) the predetermined number of the main coils included in a given one of the stator teeth groups and (ii) one or more of the sub-coils included in one or more of the other stator teeth groups that are in a different position from the given one of the stator teeth groups in terms of electrical angle, and
coils in a second phase are constituted by, in series, (i) one or more of the sub-coils included in the given one of the stator teeth groups and (ii) the predetermined number of the main coils included in one of more of the other stator teeth groups that are in a different position from the given one of the stator teeth groups in terms of electrical angle.

2. The synchronous electric motor of claim 1, wherein
the one or more of the other stator teeth groups that are in a different position from the given one of the stator teeth groups in terms of electrical angle are neighboring stator teeth groups of the given one of the stator teeth groups.

3. The synchronous electric motor of claim 1, wherein
for each of the stator teeth groups, the sub-coils are wound around two or more of the stator teeth among the predetermined number of stator teeth, and
the coils in the first phase comprise (i) the predetermined number of the main coils included in the given one of the stator teeth groups, (ii) one or more of the sub-coils included in a forward-positioned one of the stator teeth groups relative to the given one of the stator teeth groups, and (iii) one or more of the sub-coils included in a rearward-positioned one of the stator teeth groups relative to the given one of the stator teeth groups, all in terms of electrical angle, (i), (ii), and (iii) being serially connected.

4. The synchronous electric motor of claim 1, wherein
for each of the stator teeth groups, only the main coils are wound around specific stator teeth among the predetermined number of stator teeth, and
the coils in the first phase have an end that is connected to an input terminal in a corresponding phase, an opposite end that is connected to a neutral point, the predetermined number of the main coils, and the one or more sub-coils, connected in turn so that the main coils wound around the specific stator teeth are closest to the input terminal.

5. The synchronous electric motor of claim 1, wherein
for each of the stator teeth groups, only the main coil is wound around a first one of the stator teeth among the predetermined number of stator teeth, and the main coil as well as the sub-coil are wound around a second one of the stator teeth neighboring the first one of the stator teeth, and
a coil ratio of the main coil to the sub-coil wound around the second one of the stator teeth is defined so that a magnetic field produced by the first one of the stator teeth is at maximum magnitude when the first one of the stator teeth and the magnetic dipoles of the rotor come to be in a predetermined positional relationship, and a magnetic field produced by the second one of the stator teeth is at maximum magnitude when the rotor rotates so that the second one of the stator teeth and the magnetic dipoles of the rotor come to be in an identical positional relationship to the predetermined positional relationship.

6. The synchronous electric motor of claim 5, wherein
for each of the stator teeth groups, in order for a maximum value of the magnetic field produced by the first one of the stator teeth and a maximum value of the magnetic field produced by the second one of the stator teeth to be identical, a number of loops is fixed for the main coil wound around the first one of the stator teeth as well as for the main coil and the sub-coil wound around the second one of the stator teeth.

7. The synchronous electric motor of claim 1, wherein
for each of the stator teeth groups, only the main coil is wound around a first one of the stator teeth among the predetermined number of stator teeth, and the main coil as well as the sub-coil are wound around a second one of the stator teeth neighboring the first one of the stator teeth, and
a coil coefficient $\alpha$ is defined by the following (i) and (ii):
(i) when $k=3m$, $\alpha=|2\pi/A-2\pi/B|\cdot P$; and
(ii) when $k=3m+1$ or when $k=3m+2$, $\alpha=|2\pi/A-2\pi/B|\cdot P/2$;
where
A is a number of magnetic dipoles (A is even, $A \geq 2$),
B is a number of stator teeth (B is a multiple of 3, $B \neq A$),
P is a number of magnetic dipole pairs (P=A/2),
m is a positive integer, and
k is a number of stator teeth per phase (k=B/3); and
a number of loops of the main coil wound around the second one of the stator teeth is approximately equal to:

$(N1)\cdot[\sin(\pi/3-\alpha)/\sin(\pi/3)]$, and a number of loops of the sub-coil wound around the second one of the stator teeth is approximately equal to:

$(N1)\cdot[\sin(\alpha)/\sin(\pi/3)]$ where
N1 is a number of loops of the main coil wound around the first one of the stator teeth.

8. The synchronous electric motor of claim 1, wherein
for each of the stator teeth groups, the main coils and the sub-coils are wound around the predetermined number of stator teeth,
a coil coefficient $\alpha$ is defined by the following (i) and (ii):
(i) when $k=3m$, $\alpha=|2\pi/A-2\pi/B|\cdot P$; and
(ii) when $k=3m+1$ or when $k=3m+2$, $\alpha=|2\pi/A-2\pi/B|\cdot P/2$;
where
A is a number of magnetic dipoles (A is even, $A \geq 2$),
B is a number of stator teeth (B is a multiple of 3 $B \neq A$),
P is a number of magnetic dipole pairs (P=A/2),
m is a positive integer, and
k is a number of stator teeth per phase (k=B/3); and
for any given N1, when a number of loops of the main coils is equal to:

$(N1)\cdot[\sin(\pi/3-\alpha)/\sin(\pi/3)]$, then a number of loops of the sub-coils is approximately equal to:

$(N1)\cdot[\sin(\alpha)/\sin(\pi/3)]$.

9. The synchronous electric motor of claim 1, wherein
for each of the stator teeth groups, only the main coil is wound around a first one of the stator teeth among the predetermined number of stator teeth, and the main coil as well as the sub-coil are wound around a second one of the stator teeth neighboring the first one of the stator teeth, and
the second one of the stator teeth is offset by a radians from a position $\pi$ radians from the first one of the stator teeth, in terms of electrical angle, then
a number of loops of the main coil wound around the second one of the stator teeth is approximately equal to:

$(N1)\cdot[\sin(\pi/3-\alpha)/\sin(\pi/3)]$, and a number of loops of the sub-coil wound around the second one of the stator teeth is approximately equal to:

$(N1)\cdot[\sin(\alpha)/\sin(\pi/3)]$ where
N1 is a number of loops of the main coil wound around the first one of the stator teeth.

10. The synchronous electric motor of claim 1, wherein
for each of the stator teeth groups, only the main coil is wound around a first one of the stator teeth among the predetermined number of stator teeth, and the main coil as well as the sub-coil are wound around a second one of the stator teeth neighboring the first one of the stator teeth, and
a sum of (i) loops of the main coil and (ii) loops of the sub-coil wound around the second one of the stator teeth is approximately equal to a number of loops of the main coil wound around the first one of the stator teeth.

11. The synchronous electric motor of claim 1, wherein the synchronous electric motor is a coreless synchronous electric motor that maintains positional relationships of each of the coils while lacking the stator teeth.

12. The synchronous electric motor of claim 1, wherein at least one among the plurality of stator teeth is arranged in a skew arrangement that advances along the axial direction of the rotor by, at most, the circumferential interval between the stator teeth.

13. The synchronous electric motor of claim 1, wherein the synchronous electric motor is an inner rotor synchronous electric motor.

14. The synchronous electric motor of claim 1, Wherein the synchronous electric motor is an interior permanent magnet synchronous electric motor.

15. The synchronous electric motor of claim 1, wherein. the synchronous electric motor is intended for use in vehicles.

16. The synchronous electric motor of claim 1, wherein or each of the stator teeth groups, the predetermined number of stator teeth included therein are consecutively arranged at intervals different from the intervals of the magnetic dipoles of the rotor, and in addition, the intervals of the predetermined number of stator teeth are spaced closer to the intervals of the magnetic dipoles than is the case when all of the plurality of stator teeth are arranged circumferentially at equal intervals.

17. A synchronous electric motor, comprising:
a rotor having a plurality of radially-oriented magnetic dipoles distributed circumferentially along a rotation direction of the rotor at equal intervals; and
a stator having a plurality of stator teeth arranged circumferentially along the rotation direction of the rotor, wherein the plurality of stator teeth form stator teeth groups, each of the stator teeth groups including a predetermined number of consecutive stator teeth and the stator teeth groups being arranged at equal intervals, for each of the stator teeth groups, the predetermined number of stator teeth included therein are arranged at intervals different from the intervals of the magnetic dipoles of the rotor, a main coil is wound around each of the predetermined number of stator teeth and a sub-coil is further wound around each of one or more stator teeth among the predetermined number of stator teeth, coils in a first phase are constituted by, in series, (i) the predetermined number of the main coils included in a given one of the stator teeth groups and (ii) one or more of the sub-coils included in one or more of the other stator teeth groups that are in a different position from the given one of the stator eeth groups in terms of electrical angle, coils in a second phase are constituted by, in series, (i) one or more of the sub-coils included in the given one of the stator teeth groups and (ii) the predetermined number of the main coils included in one of more of the other stator teeth groups that are in a different position from the given one of the stator teeth groups in terms of electrical angle, for each of the stator teeth groups, only the main coils are wound around specific stator teeth among the predetermined number of stator teeth, and the coils in the first phase have an end that is connected to an input terminal in a corresponding phase, an opposite end that is connected to a neutral point, the predetermined number of the main coils, and the one or more sub-coils, connected in turn so that the main coils wound around the specific stator teeth are closest to the input terminal.

* * * * *